United States Patent
Suh et al.

(10) Patent No.: US 11,790,065 B2
(45) Date of Patent: *Oct. 17, 2023

(54) METHOD AND APPARATUS FOR VERIFYING USER USING MULTIPLE BIOMETRIC VERIFIERS

(71) Applicant: Samsung Electronics Co., Ltd., Suwon-si (KR)

(72) Inventors: Sungjoo Suh, Seoul (KR); Seungju Han, Seoul (KR); Jae-Joon Han, Seoul (KR); Chang Kyu Choi, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 109 days.

This patent is subject to a terminal disclaimer.

(21) Appl. No.: 17/240,059

(22) Filed: Apr. 26, 2021

(65) Prior Publication Data

US 2021/0240810 A1 Aug. 5, 2021

Related U.S. Application Data

(63) Continuation of application No. 15/489,053, filed on Apr. 17, 2017, now Pat. No. 10,990,658.

(30) Foreign Application Priority Data

Jul. 11, 2016 (KR) .................. 10-2016-0087478
Oct. 10, 2016 (KR) .................. 10-2016-0130758

(51) Int. Cl.
*G06F 21/32* (2013.01)
*H04L 9/40* (2022.01)

(52) U.S. Cl.
CPC .......... *G06F 21/32* (2013.01); *H04L 63/0861* (2013.01); *H04L 63/105* (2013.01); *H04L 2463/082* (2013.01)

(58) Field of Classification Search
None
See application file for complete search history.

(56) References Cited

U.S. PATENT DOCUMENTS 7,747,044 B2 6/2010 Baker et al.
8,887,259 B1 11/2014 Harding
(Continued)

FOREIGN PATENT DOCUMENTS

CN 101127599 A 2/2008
JP S62-212781 A 9/1987
(Continued)

OTHER PUBLICATIONS

Chinese Office Action dated Feb. 16, 2022 for corresponding Chinese Application No. 201710426745.8, and English-language translation thereof.

(Continued)

*Primary Examiner* — Bassam A Noaman
(74) *Attorney, Agent, or Firm* — Harness, Dickey & Pierce, P.L.C.

(57) ABSTRACT

A user verification apparatus may perform user verification using multiple biometric verifiers. The user verification apparatus may set a termination stage of one or more biometric verifiers. Multiple biometric verifiers may be used to generate outputs, for which separate termination stages are set to establish a particular combination of set termination stages associated with the multiple biometric verifiers, and the user verification apparatus may fuse outputs of the biometric verifiers based on the particular combination of set termination stages. The user verification apparatus may verify a user based on a result of the fusing, and an unlocking command signal may be generated based on the verifying. The unlocking command signal may be generated (Continued)

to selectively grant access, to the verified user, to one or more elements of a device. The device may be a vehicle.

17 Claims, 12 Drawing Sheets

(56) References Cited

U.S. PATENT DOCUMENTS

| | | | |
|---|---|---|---|
| 9,096,189 B2* | 8/2015 | Golden | G07C 9/00563 |
| 9,430,629 B1 | 8/2016 | Ziraknejad et al. | |
| 9,530,047 B1 | 12/2016 | Tang et al. | |
| 2005/0238207 A1 | 10/2005 | Tavares | |
| 2006/0129838 A1 | 6/2006 | Chen et al. | |
| 2006/0294393 A1 | 12/2006 | McCall | |
| 2009/0271635 A1 | 10/2009 | Liu et al. | |
| 2010/0046806 A1 | 2/2010 | Baughman et al. | |
| 2011/0032076 A1 | 2/2011 | Rickman | |
| 2011/0044514 A1 | 2/2011 | Rahmes et al. | |
| 2014/0181959 A1 | 6/2014 | Li et al. | |
| 2014/0214630 A1* | 7/2014 | N | G07F 9/009 705/27.2 |
| 2014/0314283 A1 | 10/2014 | Harding | |
| 2017/0102970 A1 | 4/2017 | Kolk et al. | |
| 2017/0193208 A1 | 7/2017 | Ashley et al. | |
| 2017/0287490 A1 | 10/2017 | Biswal et al. | |

FOREIGN PATENT DOCUMENTS

| | | |
|---|---|---|
| JP | 2003-058889 A | 2/2003 |
| JP | 2003-067340 A | 3/2003 |
| JP | 2003-109003 A | 4/2003 |
| JP | 2003-115051 A | 4/2003 |
| JP | 2005-317049 A | 11/2005 |
| JP | 2007-058683 A | 3/2007 |
| JP | 2008-040944 A | 2/2008 |
| JP | 2008-059197 A | 3/2008 |
| JP | 2008-097097 A | 4/2008 |
| JP | 2010-092119 A | 4/2010 |
| JP | 2010-277232 A | 12/2010 |
| JP | 2013-210830 A | 10/2013 |
| JP | 2014-232453 A | 12/2014 |
| JP | 2015-153258 A | 8/2015 |
| JP | 2016-038913 A | 3/2016 |
| KR | 100384294 B1 | 5/2003 |
| KR | 10-0701583 B1 | 3/2007 |

OTHER PUBLICATIONS

European Office Action dated Oct. 17, 2017 for corresponding EU Application No. 17178009.1.

Honglei Wei et al., Fingerprint Verification Based on Multistage Minutiae Matching, International Conference on Pattern Recognition, vol. 2, Jan. 1, 2006, p. 1058-1061, xPO55413433.

Djamel Samai et al., "Multimodal Biometric System based on Palmprint using Progressive Image Compression", International Conference on Information Technology for Organizations Development, IEEE, Apr. 1, 2016.

Japanese Office Action dated Jun. 29, 2021 for corresponding Japanese Application No. 2017-116898, and English-language translation thereof.

* cited by examiner

METHOD AND APPARATUS FOR VERIFYING USER USING MULTIPLE BIOMETRIC VERIFIERS

CROSS-REFERENCE TO RELATED APPLICATIONS

This application is a continuation of U.S. non-provisional patent application Ser. No. 15/489,053, filed Apr. 17, 2017, which claims priority under 35 U.S.C. § 119 to Korean Patent Application No. 10-2016-0087478 filed on Jul. 11, 2016, and Korean Patent Application No. 10-2016-0130758 filed on Oct. 10, 2016, in the Korean Intellectual Property Office, the entire contents of each of which are incorporated herein by reference in their entirety.

BACKGROUND

1. Field

At least one example embodiment relates to user verification methods and apparatuses using a plurality of biometric verifiers.

2. Description of the Related Art

Biometrics-based verification or authentication technology may be used to perform user verification using a fingerprint, a face, an iris, blood vessels, and the like. Such biological characteristics used for the verification differ from individual to individual, rarely change during a lifetime, and have a low risk of being stolen or copied. In addition, individuals do not need to intentionally carry such characteristics at all times and thus, may not suffer an inconvenience using the biological characteristics. However, due to an environmental condition, for example, a temperature, an intensity of illumination, and a degree of humidity, misrecognition or misidentification may occur in biometric verification. Thus, verification technology using various pieces of biometric information simultaneously may be desired.

SUMMARY

At least one example embodiment relates to a user verification method.

In at least one example embodiment, the user verification method may include setting a termination stage of each biometric verifier of a plurality of biometric verifiers, such that each biometric verifier of the plurality of biometric verifiers is associated with a separate termination stage of a particular combination of termination stages, respectively. The user verification method may include executing the plurality of biometric verifiers, based on the particular combination of termination stages associated with the plurality of biometric verifiers, to generate a plurality of outputs. The user verification method may include fusing the plurality of outputs based on the particular combination of termination stages associated with the plurality of biometric verifiers to generate a result. The user verification method may include verifying a user based on the result and generating an unlocking command signal to enable at least partial user access to a device, based on the verifying.

Each biometric verifier may be configured to be executed to output an individual verification result through a set of stages of the biometric verifier, the set of stages including at least one stage.

The set termination stage of the biometric verifier may be a particular stage of the plurality of stages. Each biometric verifier may be configured to be executed to output an individual verification result corresponding to the set termination stage of the biometric verifier.

The setting may include setting a termination stage at least one biometric verifier based on a particular criterion.

The criterion may include an application type associated with a received verification request, a security level associated with the received verification request, a sensing environment associated with the user verification apparatus, a determination of whether the at least one biometric verifier is to be executed to perform main verification or auxiliary verification, and/or a selection by a user at a user interface.

The setting may include setting, to be the termination stage of the at least one biometric verifier, a particular stage of the plurality of stages of the at least one biometric verifier at which a verification rate (VR) and a false acceptance rate (FAR) associated with an individual verification result of the given stage at least meet a threshold VR and a threshold FAR, respectively, based on the particular criterion.

The biometric verifiers may be configured to be executed to perform biometric verification of different modalities.

Each biometric verifier of the plurality of biometric verifiers may be configured to be executed to perform biometric verification based on received biometric information, the received biometric information including one of a face, a fingerprint, an iris, a vein, palm lines, a shape of an ear, and an electrocardiogram (ECG).

The fusing may include fusing the plurality of outputs based on executing a fusion model corresponding to the particular combination of termination stages associated with the plurality of biometric verifiers among a plurality of fusion models associated with separate, respective combinations of termination stages associated with the plurality of biometric verifiers.

The verifying may include verifying the user based on comparing the result of the fusing and a threshold value corresponding to the plurality of termination stages of the plurality of biometric verifiers.

At least one biometric verifier of the plurality of biometric verifiers may include a fingerprint verifier. The fingerprint verifier may be configured to be executed to output an individual verification result based on executing each stage of a plurality of stages of the fingerprint verifier. Executing a first stage of the plurality of stages may include outputting an overlapping area and a matching score between a registered fingerprint image and an input fingerprint image. Executing a second stage of the plurality of stages may include outputting matching scores between the registered fingerprint image and blocks generated based on partitioning the input fingerprint image.

At least one biometric verifier of the plurality of biometric verifiers may include a face verifier. The face verifier may be configured to be executed to output an individual verification result of each layer based on comparing features to be output by multiple layers in a neural network, based on an input image and features of a stored registered image corresponding to the layers.

The setting may include selecting one biometric verifier of the plurality of biometric verifiers as a main verifier, selecting another biometric verifier of the plurality of biometric verifiers as a sub-verifier, selecting, from a plurality of separate combinations of a termination stage of the main verifier and a termination stage of the sub-verifier, a particular combination of the termination stage of the main verifier and the termination stage of the sub-verifier that increases a level of the termination stage of the main verifier.

The fusing may include fusing the plurality of outputs using a fusion model configured to output a final verification result to verify the user based on an input vector of a dimension corresponding to an output of the set termination stage.

A non-transitory computer-readable medium may store instructions that, when executed by a processor, cause the processor to perform the user verification method.

At least one example embodiment relates to a user verification apparatus.

In at least one example embodiment, a user verification apparatus includes a memory storing a program of instructions and a processor. The processor may be configured to execute the program of instructions to set a termination stage of each biometric verifier of a plurality of biometric verifiers, such that each biometric verifier of the plurality of biometric verifiers is associated with a separate termination stage of a particular combination of termination stages, respectively. The processor may be configured to execute the program of instructions to execute the plurality of biometric verifiers, based on the particular combination of termination stages associated with the plurality of biometric verifiers, to generate a plurality of outputs. The processor may be configured to execute the program of instructions to execute a fusion model to fuse the plurality of outputs based on the particular combination of termination stages associated with the plurality of biometric verifiers to generate a verification result. The processor may be configured to execute the program of instructions to generate an unlocking command signal to enable at least partial user access to a device, based on the verification result.

The processor may be configured to execute each given biometric verifier to output an individual verification result through a plurality of stages of the given biometric verifier.

Each set termination stage may be a particular stage of a plurality of stages associated with a particular biometric verifier of the plurality of biometric verifiers. The processor may be configured to execute the program of instructions to output an individual verification result corresponding to the set termination stage associated with the biometric verifier, of the plurality of stages associated with the biometric verifier.

The processor may be configured to set the termination stage of at least one biometric verifier based on a particular criterion.

The criterion may include an application type associated with a received verification request, a security level associated with the received verification request, a sensing environment associated with the user verification apparatus, a determination of whether the at least one biometric verifier is to be executed to perform main verification or auxiliary verification, and/or a selection by a user at a user interface.

The processor may be configured to set, to be the termination stage of the at least one biometric verifier, a particular stage of the plurality of stages of the at least one biometric identifier at which a verification rate (VR) and a false acceptance rate (FAR) associated with an individual verification result of the given stage at least meet a threshold VR and a threshold FAR, respectively, based on the criterion.

The processor may be configured to execute separate biometric verifiers to perform biometric verification of different modalities.

The processor may be configured to execute each biometric verifier of the plurality of biometric verifiers to perform biometric verification based on received biometric information, the received biometric information including one of a face, a fingerprint, an iris, a vein, palm lines, a shape of an ear, and an electrocardiogram (ECG).

The processor may be configured to fuse the plurality of outputs of the plurality of biometric verifiers, respectively, using a fusion model corresponding to the particular combination of termination stages associated with the plurality of biometric verifiers, among a plurality of fusion models associated with separate, respective combinations of termination stages associated with the plurality of biometric verifiers.

At least one biometric verifier of the plurality of biometric verifiers may include a fingerprint verifier. The processor may be configured to execute the fingerprint verifier to output an individual verification result based on executing each stage of a plurality of stages of the fingerprint verifier. Executing a first stage of the plurality of stages may include outputting an overlapping area and a matching score between a registered fingerprint image and an input fingerprint image. Executing a second stage of the plurality of stages may include outputting matching scores between the registered fingerprint image and blocks generated based on partitioning the input fingerprint image.

At least one biometric verifier of the plurality of biometric verifiers may include a face verifier. The processor may be configured to execute the face verifier to output an individual verification result of each layer based on comparing features to be output by multiple layers in a neural network, based on an input image and features of a stored registered image corresponding to the layers.

Executing the fusion model may include outputting a final verification result for user verification based on an input vector of a dimension corresponding to an output of the particular combination of termination stages associated with the plurality of biometric verifiers.

The processor may be configured to select one biometric verifier of the plurality of biometric verifiers as a main verifier, select another biometric verifier of the plurality of biometric verifiers as a sub-verifier, set a minimum stage of the main verifier, from among a plurality of stages of the main verifier, to be a termination stage of the main verifier, and set a maximum stage of the sub-verifier, from among a plurality of stages of the sub-verifier, to be a termination stage of the sub-verifier.

In at least one example embodiment, a user verification apparatus, may include a memory storing a program of instructions and a processor. The processor may be configured to execute the program of instructions to receive a user verification request, the user verification request including a criterion. The processor may be configured to execute the program of instructions to set a termination stage of a biometric verifier based on the criterion. The processor may be configured to execute the program of instructions to execute the biometric verifier, based on the set termination stage, to generate an individual verification result. The processor may be configured to execute the program of instructions to verify a user based on the individual verification result. The processor may be configured to execute the program of instructions to generate an unlocking command signal to enable at least partial user access to a device, based on the verifying.

The user verification apparatus may include a vehicle configured to transport one or more occupants. The generating the unlocking command signal may include selectively granting, to the user, access to an interior of the vehicle based on the verifying, and/or selectively grant, to the user, control over one or more driving elements of the vehicle based on the verifying.

Additional aspects of example embodiments will be set forth in part in the description which follows and, in part, will be apparent from the description, or may be learned by practice of the disclosure.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
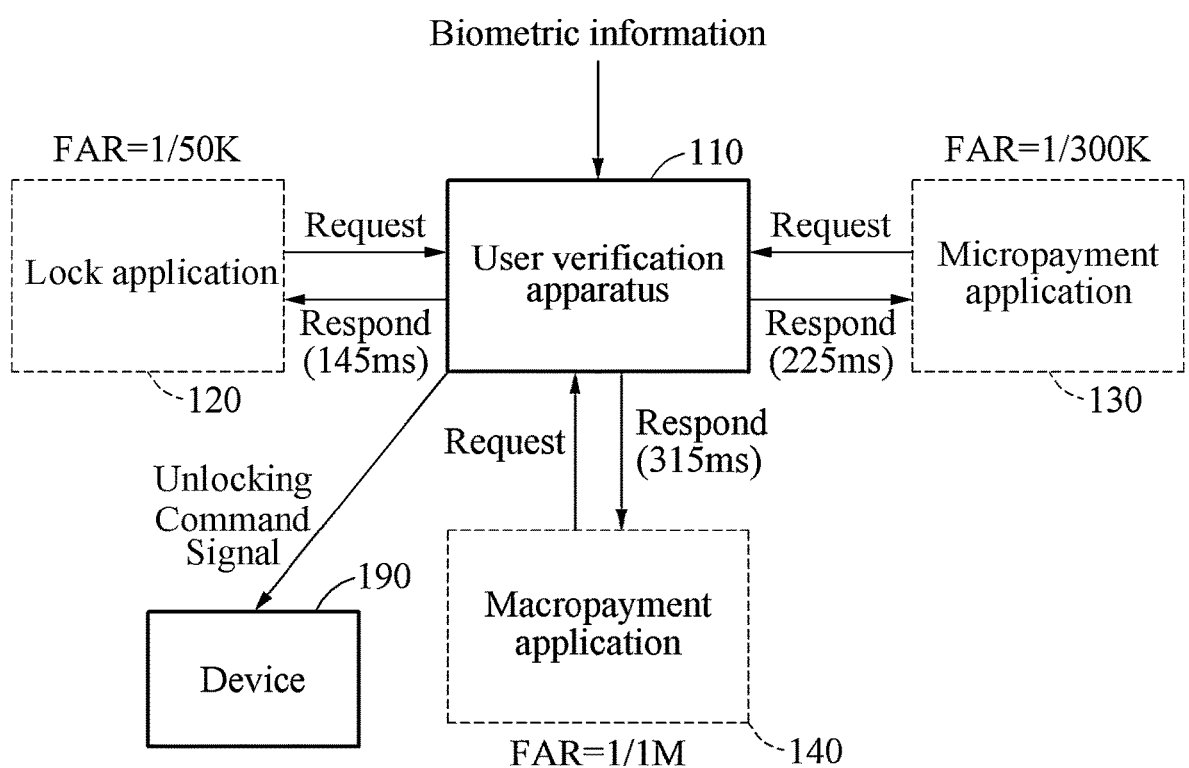
FIG. 1 is a diagram illustrating a user verification system according to at least one example embodiment.

Hereinafter, at least one example embodiment will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which at least one example embodiment are shown. In the drawings, the thicknesses of layers and regions are exaggerated for clarity.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples are described in detail with reference to the accompanying drawings. Like reference numerals in the drawings denote like elements, and a known function or configuration will be omitted herein. The examples to be described hereinafter may be used for user verification or authentication. For example, the examples may be used for user verification to use a mobile device, such as, for example, a smartphone, a smart vehicle, and a smart home appliance, or used for user verification to use electronic commerce (e-commerce). Based on a specification required for an application for which user verification is needed, accuracy in the user verification or a speed for performing the user verification may be flexibly improved.

FIG. 1 is a diagram illustrating a user verification system according to at least one example embodiment. Referring to FIG. 1, an apparatus for user verification, hereinafter simply referred to as a user verification apparatus 110, may be embodied as a software module, a hardware module, or a combination thereof, and may receive a request for verification, or a verification request, from various applications and transmit a response to the verification request to the applications. The user verification apparatus 110 may generate a result of the verification by comparing biometric information measured by various sensors and pre-registered biometric information, and transmit the generated result as the response to the verification request. Although described in detail later, the user verification apparatus 110 may perform user verification using a plurality of biometric verifiers. The biometric verifiers may perform biometric verification of different modalities, and at least one biometric verifier may be a verifier that may output a result of the verification through multiple stages.

As shown in FIG. 1, the user verification apparatus 110 may be communicatively coupled ("connected") to a device 190. In at least one example embodiment, the user verification apparatus 110 is included within, as an element of, the device 190. As described further below, the device 190 may include an electronic device that may include a user interface (e.g., a touchscreen display). In at least one example embodiment, the device 190 may be a vehicle (e.g., an automobile) configured to transport one or more users ("occupants") through an environment.

The user verification apparatus 110 may include a plurality of biometric verifiers. Such biometric verifiers may be implemented by a processor executing a program of instructions stored on a memory. The user verification apparatus 110 may generate the result of the verification by setting a termination stage of the at least one biometric verifier that supports multi-stage biometric verification based on an application, and fusing outputs of the biometric verifiers based on the set termination stage. For convenience of description, an output of each of the biometric verifiers is referred to as an individual verification result, and a result of fusing the outputs of the biometric verifiers is referred to as a final verification result. For example, a result to be output from individual stages of the biometric verifier that supports the multi-stage biometric verification and a result to be output from a biometric verifier that does not support the multi-stage biometric verification may be an individual verification result, and the result to be transmitted as the response to the verification request may be a final verification result. As referred to herein, a final verification result includes information indicating, to a requesting application (e.g., 120/130/140), an identity associated with a user based on received biometric information.

Such a final verification result may be used for user verification in various applications. Based on such user verification (e.g., verifying a user based on the final verification result, the user verification apparatus 110 may generate an unlocking command signal. The unlocking command signal, as shown in FIG. 1, may be transmitted to device 190. The unlocking command signal may include a signal that includes information indicating that the user matches or substantially matches ("correlates") with an enrolled user.

For example, a lock application 120 may be executed to cancel a lock of a terminal based on the final verification result, and a micropayment application 130 or a macropayment application 140 may be executed to perform online payment based on the final verification result. Although the micropayment application 130 and the macropayment application 140 will be described separately for convenience of description, the micropayment application 130 and the macropayment application 140 may be included in one online commerce application, or included in a functionality of the online commerce application that is performed based on a sum of money to be paid. At least some applications, including one or more of the lock application 120, micropayment application 130, and the macropayment application 140 may be implemented externally to a device (e.g., an electronic device and/or vehicle) implementing the user verification apparatus 110, including applications executed on a remote server and in communication with a device implementing the user verification apparatus 110 via a communication interface. Such a communication interface may be included in a device implementing ("including") the user verification apparatus 110.

The applications may have different verification characteristics based on a type of an application. For example, the lock application 120 may require a high verification speed despite a relatively low security level. The micropayment application 130 may require a middle verification speed and a middle security level, and the macropayment application 140 may require a high security level despite a low verification speed. Here, the terms "high," "middle," and "low" levels are used to indicate three different security levels, and do not indicate absolute values of the levels. When a security level increases, accuracy or reliability of the final verification result may be improved, although an amount of time used for obtaining the final verification result may increase. Although the security level may be determined based on a type of an application, different security levels may be set for applications of the same type due to various variables, such as, for example, settings by a user and a surrounding environment. As referred to herein, "security level" of a verification result refers to a confidence level associated with an identification of a user provided in the final verification result. In addition, as referred to herein, "verification speed" refers to a permitted period of elapsed time from the transmission of the verification request until the verification result is received at the requesting application. In at least one example embodiment, a verification request that is received at the user verification apparatus 110 from an application may include parameter information indicating at least one of a specified threshold FAR, a specified threshold verification speed, and/or a specified threshold security level to be associated with a final verification result that is provided by the user verification apparatus 110 in response to the verification request. In at least one example embodiment, the user verification apparatus 110 may store information associating a given application with at least one of a specified threshold FAR, a specified threshold verification speed, and/or a specified threshold security level to be associated with a final verification result that is provided by the user verification apparatus 110 in response to receiving the verification request from the application at the user verification apparatus 110. In at least one example embodiment, a particular security level may be associated, at the user verification apparatus 110, with a particular verification request received at the user verification apparatus 110 from an application, based on one or more of the a "type" associated with the application, user-initiated settings, information associated with a surrounding environment, or the like.

The user verification apparatus 110 may adjust a verification speed or accuracy based on verification characteristics of applications. For example, when there is a single biometric verifier that supports the multiple stages, a verification performance and a verification speed may be determined by a combination of a termination stage of the biometric verifier and another biometric verifier. For another example, where there is a plurality of biometric verifiers that supports the multiple stages, a verification performance and a verification speed may be determined by a combination of a plurality of termination stages. As referred to herein, "verification performance" and "verification accuracy" are parameters expressing control of the verifiers of apparatus

110 to provide a verification result that meets a specified "security level" and/or "verification speed" corresponding to a FAR associated with a verification request from an application.

In detail, for example, when a false acceptance rate (FAR) required for the lock application 120 is 1/50 kilo (K), the user verification apparatus 110 may perform verification based on the FAR, and provide a response for a relatively short period of time, for example, 145 milliseconds (ms). The user verification apparatus 110 may determine a termination stage or a combination of termination stages that satisfies the FAR of 1/50 K. For example, when a combination of a lowest-level stage of a first biometric verifier among the biometric verifiers and a lowest-level stage of a second biometric verifier among the biometric verifiers satisfies the FAR of 1/50K and has a highest verification speed, the user verification apparatus 110 may set a first stage of the first biometric verifier to be a termination stage of the first biometric verifier, and set a first stage of the second biometric verifier to be a termination stage of the second biometric verifier. As referred to herein, a "security level" may be indicated by a "false acceptance rate (FAR)" and/or "verification rate (VR)" parameter associated with a verification request.

For another example, the micropayment application 130 may require an FAR of 1/300 K for a higher level of security compared to the lock application 120. The user verification apparatus 110 may set a stage at a higher level than the lowest-level stage to be the termination stage of the first biometric verifier, the termination stage of the second biometric verifier, or the termination stages of the two biometric verifiers, and may then transmit a final verification result that satisfies the FAR of 1/300 K. In such an example, the user verification apparatus 110 may provide a response at, for example, 225 ms. Similarly, the macropayment application 140 may require a lower FAR compared to the micropayment application 130. The user verification apparatus 110 may set a highest-level stage to be the termination stage of the first biometric verifier, the termination stage of the second biometric verifier, or the termination stages of the two biometric verifiers, and may then transmit a final verification result that satisfies an FAR of 1/1 mega(M). In such an example, the user verification apparatus 110 may provide a response at, for example, 315 ms. The biometric verifiers may be controlled, based on setting and/or re-setting the termination stages of one or more biometric verifiers, to control the "verification performance/accuracy" and/or the "verification speed" associated with a verification result to meet parameters associated with a received verification request, including a specified threshold FAR associated with the verification request. In at least one example embodiment, verification performance and verification speed are inversely related.

As described above, the user verification apparatus 110 may dynamically adjust a security level using the biometric verifiers. The biometric verifiers may perform biometric verification of different modalities, respectively, and thus multi-verification may be enabled and the security level may be improved.

In at least one example embodiment, the user verification apparatus 110 may include a memory storing a program of instructions and a processor configured to executed the stored program of instructions to implement one or more functions of the user verification apparatus 110.

In at least one example embodiment, one or more of the lock application 120, micropayment application 130, and macropayment application 140 may be implemented based on a processor executing a program of instructions stored on a memory. Such a processor and/or memory may be common with a processor and/or memory at least partially comprising and/or implementing the user verification apparatus 110.

In at least one example embodiment, the biometric information illustrated and described with reference to FIG. 1 is received from a biometric sensor device that is external to the user verification apparatus 110. As shown in FIG. 1, the biometric sensor device from which biometric information is received may be external to the user verification system. The user verification apparatus 110 and the biometric sensor device may be located in a common apparatus (e.g., an electronic device, a vehicle, some combination thereof, or the like) or separate apparatuses. In at least one example embodiment, different types of biometric information (e.g., fingerprint biometric information, facial recognition biometric information, etc.) may be received at the user verification apparatus 110 from separate, respective biometric sensor devices.

In at least one example embodiment, at least a portion of the user verification system shown in FIG. 1, including the user verification apparatus 110, may be implemented in a device 190 that is an electronic device, e.g., based on a processor executing a program of instructions stored on a memory. The electronic device may include a cellphone, a tablet computer, a wearable device, and the like. In at least one example embodiment, at least a portion of the user verification system shown in FIG. 1, including the user verification apparatus 110, may include a chip in a cellphone, a tablet computer, a wearable device, or the like.

In at least one example embodiment, at least a portion of the user verification system shown in FIG. 1, including the user verification apparatus 110 may be included in a device 190 that is an electronic device, including one or more cellphones, tablet computers, wearable devices, and the like, such that the electronic device is configured to perform biometrics-based verification or authentication. Thus, the user verification system may configure an electronic device to provide improved user security with regard to electronic device functionality access and/or control.

In at least one example embodiment, in response to a determination that a user is verified based on the verification result, the user verification apparatus 110 may generate an unlocking command signal that includes a command to at least partially unlock, to access by the verified user, a device 190 that is an electronic device. Unlocking a device 190 that is an electronic device may include commanding the device 190 to enable user access to at least a portion of the device 190 through user interaction with one or more user interfaces of and/or coupled to the device 190. In at least one example embodiment, in response to a determination that the user is verified, the user verification apparatus may generate an unlocking command signal that includes a command to assign a right to access a desired (and/or, alternatively, predetermined) function of the device 190 to the user.

In at least one example embodiment, at least a portion of the user verification system shown in FIG. 1, including the user verification apparatus 110 may be included in a device 190 that is a vehicle, including an automobile, a watercraft, an aircraft, or the like, such that the vehicle is configured to perform biometrics-based verification or authentication for vehicle security. For example, a vehicle that includes the user verification apparatus 110 may be configured to perform a facial verification operation based on a driver of a vehicle approaching the vehicle within a certain threshold distance from the vehicle. The vehicle may be further configured to subsequently perform a fingerprint verification operation when the driver grabs a door handle of the vehicle. As a result, the vehicle may be configured to selectively unlock access to and/or functions of the vehicle to the driver based on the performed operations. Thus, the user verification system may configure a vehicle to provide improved driver/user/occupant security and/or safety with regard to vehicle access and/or control.

In at least one example embodiment, in response to a determination that a user is verified based on the verification result, the user verification apparatus 110 may generate an unlocking command signal that includes a command to at least partially unlock, to access by the verified user, a device 190 that is a vehicle. Unlocking a device 190 that is a vehicle via an unlocking command signal may include commanding the device 190 to selectively grant, to the verified user, access to an interior of the vehicle based on the verifying (e.g., unlocking one or more particular doors, hatches, etc. of the vehicle). Unlocking a device 190 that is a vehicle via an unlocking command signal may include commanding the device 190 to selectively grant, to the verified user, control over one or more driving elements ("driving controls") of the vehicle (e.g., vehicle throttle control, vehicle steering control, vehicle navigation control, vehicle engine startup/shutdown control, etc.) based on the verifying.

Figure 2:
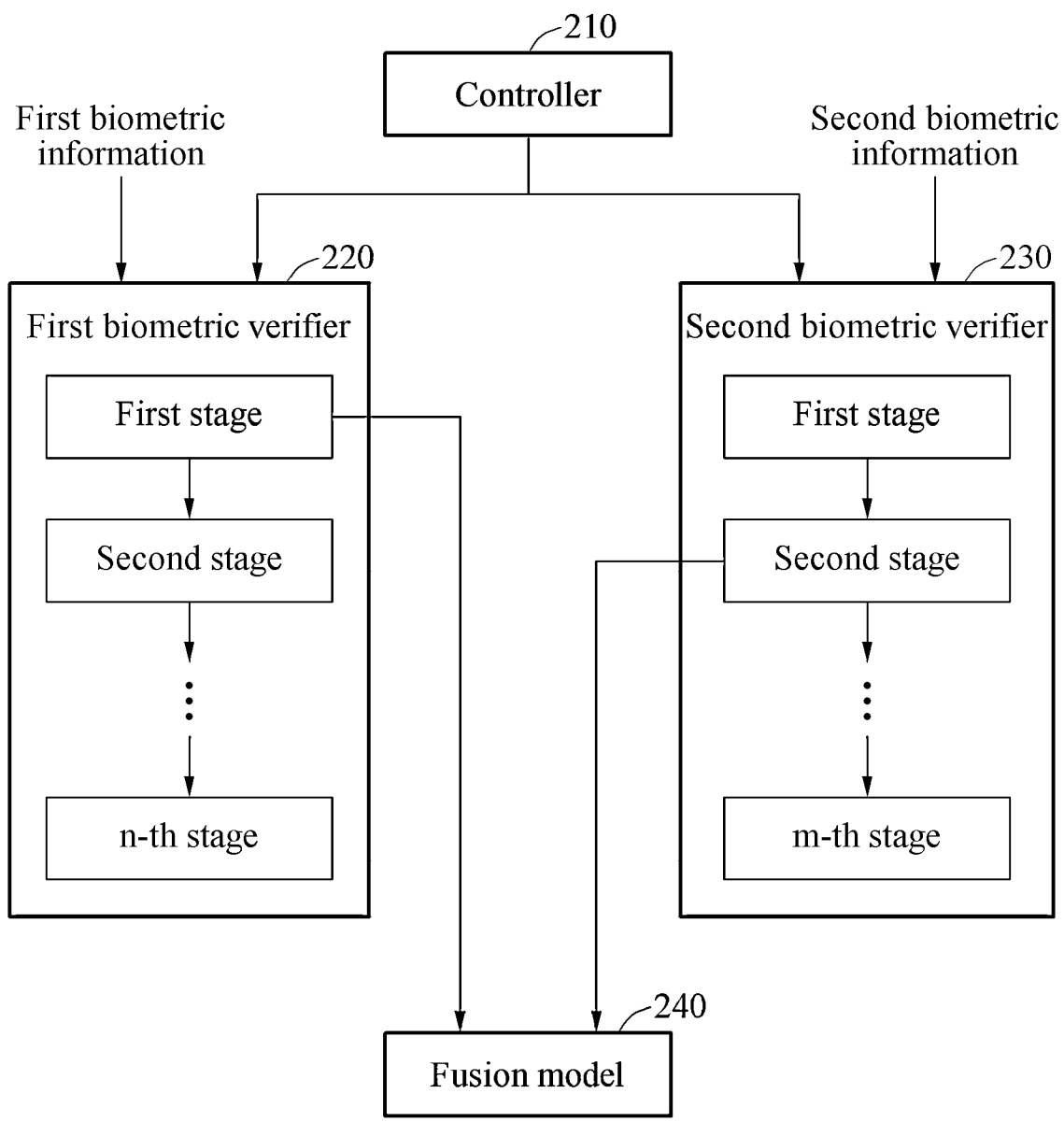
FIG. 2 is a diagram illustrating a user verification apparatus according to at least one example embodiment.

FIG. 2 is a diagram illustrating a user verification apparatus according to at least one example embodiment. Referring to FIG. 2, the user verification apparatus includes a controller 210, a plurality of biometric verifiers, for example, a first biometric verifier 220 and a second biometric verifier 230, and a fusion model 240. Each of the biometric verifiers 220 and 230 may perform biometric verification using biometric information of a user, and the fusion model 240 may generate information for user verification by fusing outputs of the biometric verifiers 220 and 230. Each of the biometric verifiers 220 and 230 may include multiple stages. For example, the first biometric verifier 220 may include n stages, and the second biometric verifier 230 may include m stages. In at least one example embodiment, each of the elements illustrated in FIG. 2 may be implemented by a processor executing a program of instructions stored in a memory.

In at least one example embodiment, each biometric verifier of the first and second biometric verifiers 220 and 230 may be configured to perform a verification process that may terminate at one of various stages, where each stage corresponds to a particular "verification performance" and/or "verification accuracy" of the verification result output by the verifier to correspond to a specified security level. Each stage may be an intermediate or final step in a sequence of verification operations performed on biometric input information, where the output of each intermediate stage is input to the next stage, and where the output of a selected termination stage may be output as the verification result of the verifier.

In at least one example embodiment, each biometric verifier may be implemented as (e.g., may include) a neural network, and each stage may correspond to a layer of the neural network. In at least one example embodiment, verification performance may be proportional, and verification speed may be inversely proportional, to the level of the layer from which a verifier outputs a verification result. For example, the higher or upper layer from which a verification result is output, the more improved verification performance and the more reduced verification speed may be obtained.

When the number of stages increases, an amount of time used for verification may also increase although accuracy in the verification may be improved. The controller 210 may set at least one termination stage that outputs an individual verification result. For example, as illustrated in FIG. 2, the controller 210 sets, to be the termination stage, a first stage of the first biometric verifier 220 and a second stage of the second biometric verifier 230. In an example illustrated in FIG. 2, it is assumed that the two biometric verifiers 220 and 230 are used, and both the two biometric verifiers 220 and 230 support the multiple stages. However, such an example may be applicable to a case where three or more biometric verifiers are used and only a portion of the multiple biometric verifiers supports the multiple stages.

The controller 210 may set the termination stage of the biometric verifiers 220 and 230 based on a particular (or, alternatively, predetermined) criterion including at least one of an application type, a security level, a sensing environment, main verification or auxiliary verification, and a selection by a user. For example, when a security level of an application is high, the controller 210 may set a level of the termination stage to be high. When the level of the termination stage increases, an amount of time used for outputting an individual verification result may increase although accuracy of the individual verification result may be improved. Thus, when accuracy in verification is relatively important, the level of the termination stage may be set to be higher. In contrast, when a speed of the verification is relatively important, the level of the termination stage may be set to be lower. Accuracy and a speed for final verification may be determined by both the termination stage (or a first termination stage) of the first biometric verifier 220 and the termination stage (or a second termination stage) of the second biometric verifier 230, and the controller 210 may select a combination of the first termination stage and the second termination stage that satisfies verification accuracy and a verification speed that are required by an application. In at least one example embodiment, setting a termination stage of a biometric verifier includes configuring the verifier to provide the output information of the set stage as the verification result of the biometric verifier.

The controller 210 may set, to be the termination stage, a stage at which a verification rate (VR) and an FAR are satisfied based on the criterion among the multiple stages of the biometric verifiers 220 and 230. For an application, a VR and an FAR may be preset based on a security level. The application may provide the preset VR and FAR to the controller 210 and the controller 210 may set, to be the termination stage, a stage at which the VR and the FAR of the application are satisfied. In at least one example embodiment, each stage of a given verifier may be associated with a particular FAR and VR. In at least one example embodiment, a combination of outputs from a particular combination of verifiers at particular set termination stages may be associated with a particular FAR/VR, such that the particular combination may be selected by the controller upon a determination being made, at the user verification apparatus, that a verification request is associated with the particular FAR/VR.

According to at least one example embodiment, the controller 210 may determine a combination of termination stages in which a VR and an FAR required by an application are satisfied using a lookup table in which VRs and FARs based on combinations of termination stages are stored, and set termination stages of the multiple biometric verifiers. In such a case, a VR and an FAR for each of combinations of the stages of the first verifier 220 and the stages of the second biometric verifier 230 may be calculated in advance. In at least one example embodiment, a combination of termination stages for a particular combination of biometric verifiers may be set, at the user verification apparatus (e.g., by the controller 210) based on determining a VR and FAR associated with a verification request from an application. In at least one example embodiment, an association of termination stage combinations and VR/FARs may be stored in a lookup table and accessed by the controller 210 based on receiving, at the user verification apparatus, VR/FAR data associated with a verification request. Thus, the controller 210 may determine which termination stages to set for the verifiers based on the receipt of a verification request.

For example, in a case that an application requires a VR of 95% and an FAR of 1/50 K, and a VR and an FAR are 90% and 1/50 K, respectively, when a first stage of the first biometric verifier 220 and a second stage of the second biometric verifier 230 are set to be the termination stages, and a VR and an FAR are 98% and 1/50 K, respectively, when the first stage of the first biometric verifier 220 and a second stage of the second biometric verifier 230 are set to be the termination stages, the controller 210 may set the first stage of the first biometric verifier 220 and the second stage of the second biometric verifier 230 to be the termination stages.

The biometric verifiers 220 and 230 may operate in parallel or in series. That is, the first biometric verifier 220 and the second biometric verifier 230 may operate simultaneously during a time section T1, or operate in order during a time section T1 and a time section T2.

The biometric verifiers 220 and 230 may perform biometric verification of different modalities. That is, the first biometric verifier 220 may perform biometric verification using first modality biometric information of a user, and the second biometric verifier 230 may perform biometric verification using second modality biometric information of the user. For example, each of the biometric verifiers 220 and 230 may perform biometric verification using any one of a face, a fingerprint, an iris, a vein, palm lines, a shape of an ear, and an electrocardiogram (ECG). Since a plurality of pieces of biometric information is used, accuracy in verification may be improved, although the level of the termination stage is set to be lower, compared to using a single piece of the biometric information. In at least one example embodiment, performing biometric verification of different "modalities" includes performing biometric verification using different "modality" biometric information of a user, where each "modality" of biometric information refers to different "types" and/or "classes" of biometric information. Different types/classes of biometric information may include, for example, fingerprints, irises, ECGs, and face images. In at least one example embodiment, performing biometric verification of different modalities includes performing biometric verification of different sets/combinations of biometric input information. In at least one example embodiment, performing biometric verification associated with different modalities may include determining that the number ("quantity") of all stages of a biometric verifier is different for each verifier and a verification method to be performed by a biometric verifier is different from each biometric verifier, and thus setting the termination stages of the respective biometric verifiers accordingly. In at least one example embodiment, the biometric information to be input to a biometric verifier is different for each biometric verifier, as shown in the biometric verifier illustrated in FIG. 5 and the biometric verifier illustrated in FIG. 8.

The fusion model 240 may generate a final verification result for the user verification by fusing individual verification results output at the respective termination stages of the biometric verifiers 220 and 230, and the controller 210 may verify a user using an output of the fusion model 240. For example, the controller 210 may determine whether biometric information measured by a sensor corresponds to biometric information of a pre-registered user using the final verification result.

The fusion model 240 may include individual models corresponding to various combinations of the termination stages of the biometric verifiers 220 and 230. For example, when each of the biometric verifiers 220 and 230 includes three stages, the number of combinations of the stages may be nine and the fusion model 240 may include individual models prepared in advance corresponding respectively to the nine combinations. The controller 210 may set the respective termination stages of the biometric verifiers 220 and 230, and select an individual model corresponding to the set termination stages among the individual models included in the fusion model 240. For example, as illustrated in FIG. 2, the controller 210 may select, from the individual models, an individual model corresponding to the first stage of the first biometric verifier 220 and the second stage of the second biometric verifier 230. The selected individual model may generate information for the user verification by fusing the individual verification results of the biometric verifiers 220 and 230. A detailed description of a fusion model will be provided with reference to FIGS. 3 and 4. In at least one example embodiment, a "fusion model" is a particular model that is selected at the user verification apparatus (e.g., by controller 210) based on a selected combination of biometric verifiers and corresponding set termination stages thereof from which verification results are input to the fusion model. In some example embodiment, the selected fusion model is executed to (e.g., is configured to) "fuse" the verification results of the biometric verifiers to generate a fused verification result as the final verification result.

Although the biometric verifiers 220 and 230 and the fusion model 240 are illustrated separately from the controller 210 in FIG. 2, the biometric verifiers 220 and 230 and the fusion model 240 may operate in the controller 210.

Figure 3:
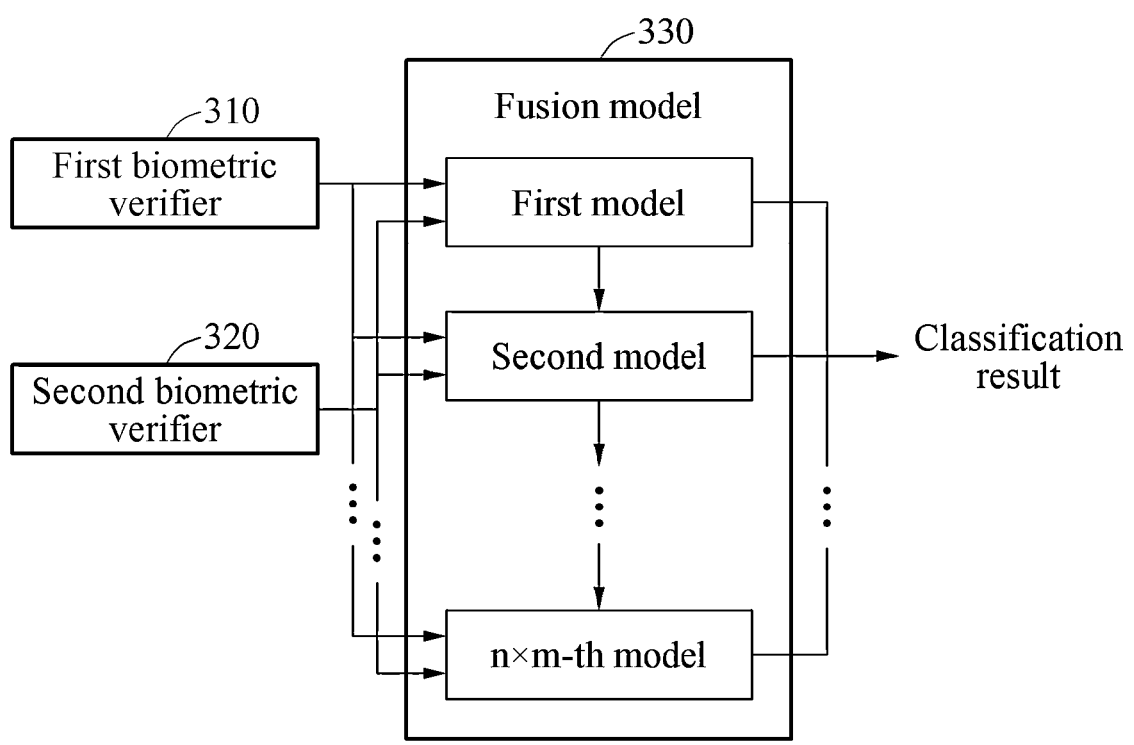
FIG. 3 is a diagram illustrating a fusion model according to at least one example embodiment.

FIG. 3 is a diagram illustrating a fusion model 330 according to at least one example embodiment. Referring to FIG. 3, the fusion model 330 includes a plurality of models corresponding to combinations of termination stages of multiple biometric verifiers, for example, a first biometric verifier 310 and a second biometric verifier 320, and outputs a final verification result based on individual verification results received from the biometric verifiers 310 and 320. To output the final verification result, each of the models included in the fusion model 330 may classify an input vector including the individual verification results of the biometric verifiers 310 and 320, and thus the final verification result may also be referred to as a classification result. In at least one example embodiment, a fusion model includes a set of multiple sub-models, where each given sub-model corresponds to a particular combination of verifiers and particular set termination stages thereof.

For example, when the first biometric verifier 310 includes n stages and the second biometric verifier 320 includes m stages, the fusion model 330 may include n x m individual models. Hereinafter, an example of a value of n being 3 and a value of m being 3 (n=m=3) will be described. However, the values of n and m are not limited to the example. In such an example of the value of n being 3 and the value of m being 3, a first model of the fusion model 330 may correspond to a first stage of the first biometric verifier 310 and a first stage of the second biometric verifier 320, and a second model of the fusion model 330 may correspond to the first stage of the first biometric verifier 310 and a second stage of the second biometric verifier 320. Similarly, a ninth model of the fusion model 330 may correspond to a third stage of the first biometric verifier 310 and a third stage of the second biometric verifier 320.

In at least one example embodiment, each fusion model may be trained to generate a final verification result according to a particular set of "n" verifiers having "m" set termination stages using training data, where the training data includes sets of biosignals for different users and sets of biosignals for a common user. The fusion model may be trained to generate verification result information that correctly identifies the sets of biosignals as either corresponding to a common user or different users.

The individual models may be trained, in advance, based on corresponding stages. Each of outputs of the biometric verifiers 310 and 320 may be represented as a vector, and the fusion model 330 may be trained based on a combination of the vectors. Each of the models included in the fusion model 330 may be a support vector machine (SVM). For example, the first model may be trained based on a combination of an output vector of the first stage of the first biometric verifier 310 and an output vector of the first stage of the second biometric verifier 320. The second model may be trained based on a combination of the output vector of the first stage of the first biometric verifier 310 and an output vector of the second stage of the second biometric verifier 320.

The fusion model 330 may be trained using training data including pairs of biosignals having a same label and pairs of biosignals having different labels. The same label indicates a same user, and the different labels indicate different users.

Hereinafter, a process of training the first model of the fusion model 330 is described in detail. In the training of the first model, the first biometric verifier 310 may receive a first biosignal having a first label, and output a first vector through the first stage. The first biometric verifier 310 may receive a second biosignal having the same label, for example, the first label, and output a second vector through the first stage. Based on a difference between the first vector and the second vector, a first individual verification result of the first stage of the first biometric verifier 310 may be obtained. Here, an individual verification result may be represented as a verification score. Similarly, a third biosignal and a fourth biosignal having the first label may be applied to the second biometric verifier 320, and a second individual verification result of the first stage of the second biometric verifier 320 may be obtained. Using pairs of biosignals having the same label, the fusion model 330 may be trained to classify, into true of a true or false method, a first input vector including the first individual verification result of the first stage of the first biometric verifier 310 and the second individual verification result of the first stage of the second biometric verifier 320.

In addition, in the training of the first model, a third individual verification result of the first stage of the first biometric verifier 310 may be obtained by applying, to the first biometric verifier 310, a fifth biosignal having the first label and a sixth biosignal having a label different from the first label, for example, a second label. Similarly, a fourth individual verification result of the first stage of the second biometric verifier 320 may be obtained by applying, to the second biometric verifier 320, a seventh biosignal having the first label and an eighth biosignal having the second label. In such a case, using pairs of biosignals having different labels, the fusion model 330 may be trained to classify, into false of the true or false method, a second input vector including the third individual verification result of the first stage of the first biometric verifier 310 and the fourth individual verification result of the first stage of the second biometric verifier 320.

The remaining models of the fusion model 330, for example, the second model through the ninth model, may be trained in the same method that is applied to the first model. Thus, each of the first through ninth models may have a characteristic corresponding to a combination of the stages included in the biometric verifiers 310 and 320, and may output a final verification result based on the individual verification results output from the biometric verifiers 310 and 320. The first through ninth models may be trained with different training samples to be output from different termination stages, and may thus have different characteristics. For example, the first through ninth models may have different VRs. In detail, since the first model is trained based on the individual verification results of the first stages of the biometric verifiers 310 and 320, the first model may have a lower VR than the ninth model that is trained based on individual verification results of the third stages of the biometric verifiers 310 and 320.

Figure 4A:
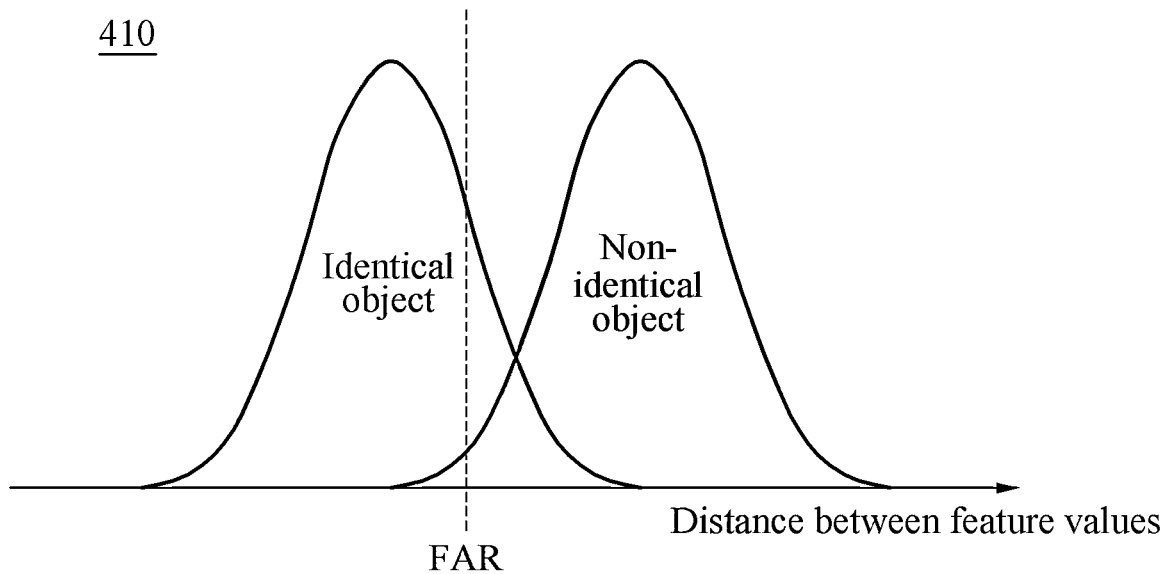
FIGS. 4A and 4B are diagrams illustrating a verification rate (VR) and a false acceptance rate (FAR) of a fusion model according to at least one example embodiment.
Figure 4B:
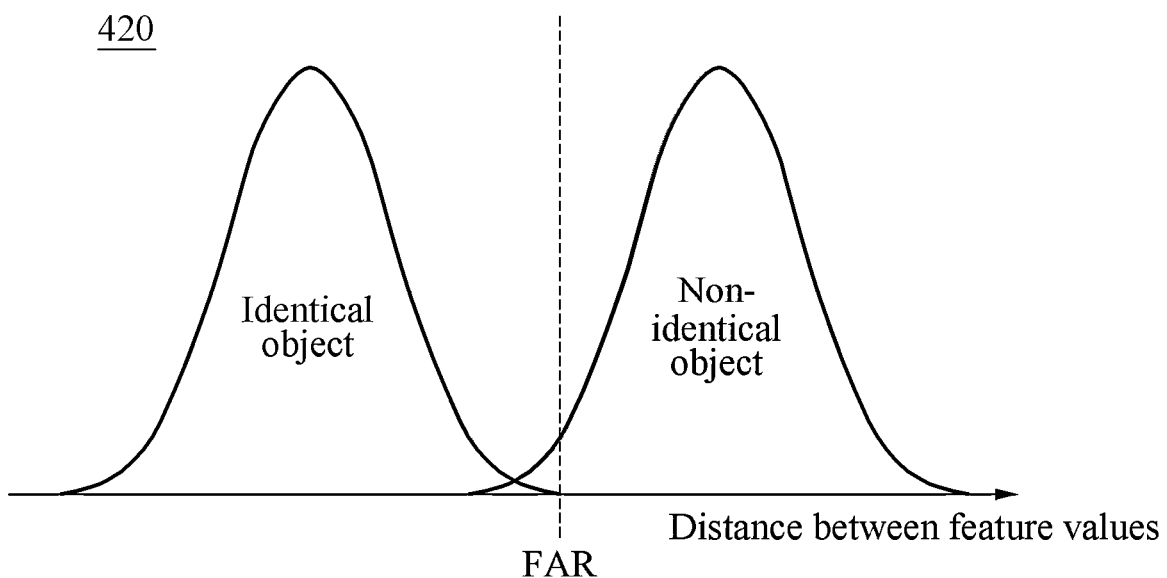

FIGS. 4A and 4B are diagrams illustrating a VR and an FAR of a fusion model according to at least one example embodiment. The graphs shown in FIGS. 4A-4B each show a distribution of quantities of samples of a pair of biosignals having various distances between feature values for the given samples for 1) biosignal pairs for identical objects and 2) biosignal pairs for non-identical objects. In at least one example embodiment, the samples in FIGS. 4A-4B are obtained from a fusion model for which training is completed. The VR and the FAR will be described hereinafter with reference to the first through ninth models of the fusion model 330 illustrated in FIG. 3. FIG. 4A illustrates a graph 410 indicating a result of verifying the first model, and FIG. 4B illustrates a graph 420 indicating a result of verifying the ninth model. Referring to the graphs 410 and 420, a graph associated with identical objects may be obtained by applying a validation data pair for the identical objects to the first model and the ninth model for which training is completed, and a graph associated with non-identical objects may be obtained by applying a validation data pair for the non-identical objects to the first model and the ninth model. In the graphs 410 and 420, an x axis indicates a distance among feature values obtained from pieces of validation data in the validation data pair, and a y axis indicates the number of samples corresponding to the distances, for example, the validation data pairs. The graph associated with the identical objects and the graph associated with the non-identical objects may be of a form of a normal distribution. Here, the identical objects indicate a same user, and the non-identical objects indicate different users.

Referring to the graphs 410 and 420, the first through ninth models may have different performances in separating the graph associated with the identical objects and the graph associated with the non-identical objects. For example, in the graph 410, when a threshold satisfying an FAR of 5% is set, a VR may be approximately 65%. In the graph 420, when a threshold satisfying an FAR of 5% is set, a VR may become close to 100%. Here, the FAR of 5% indicates a rate at which only a result, for example, a distance, included in an area corresponding to bottom 5% of an entire area of the graph associated with the non-identical objects is allowed to be misrecognized to be the identical objects. In such a case, a VR may indicate a rate of an area corresponding to a distance less than or equal to the threshold set based on the FAR of 5% of an entire area of the graph associated with the identical objects.

Similarly, according to at least one example embodiment, a controller may calculate a VR of each of the first through ninth models based on a specific FAR, and select, from a fusion model, an individual model that satisfies a VR and an FAR required by an application. For example, as illustrated in FIG. 3, when an application requires an FAR of 5% and a VR of 90%, the controller may select the third stage of the first biometric verifier 310 and the third stage of the second biometric verifier 320, and select the ninth model to be a fusion model.

In the example embodiments shown in FIGS. 4A-4B, the overlapping distributions in each graph show the relationship between the VR and FAR in a given model represented by the graph, where the verification rate (VR) corresponds to the proportion of the area of the identical object distribution that is less than or equal to a given x-axis value, and the corresponding false acceptance rate (FAR) corresponds to the proportion of the area of the non-identical object distribution that is less than or equal to the same x-axis value.

In the example embodiments shown in FIGS. 4A-4B, the graphs show that each model can be associated with a particular relationship with VR and FAR, such that each model may be associated with a particular VR given a required FAR.

In at least one example embodiment, including the example embodiments shown in FIGS. 4A-4B, if and/or when a verification request from an application is determined to be associated with a particular FAR and VR, a particular fusion model that satisfies both of the particular VR and FAR may be identified and selected (e.g., by a controller of a user verification apparatus), such that the particular combination of "n" verifiers and hat termination stages associated with the selected fusion model may further be identified and selected.

Figure 5:
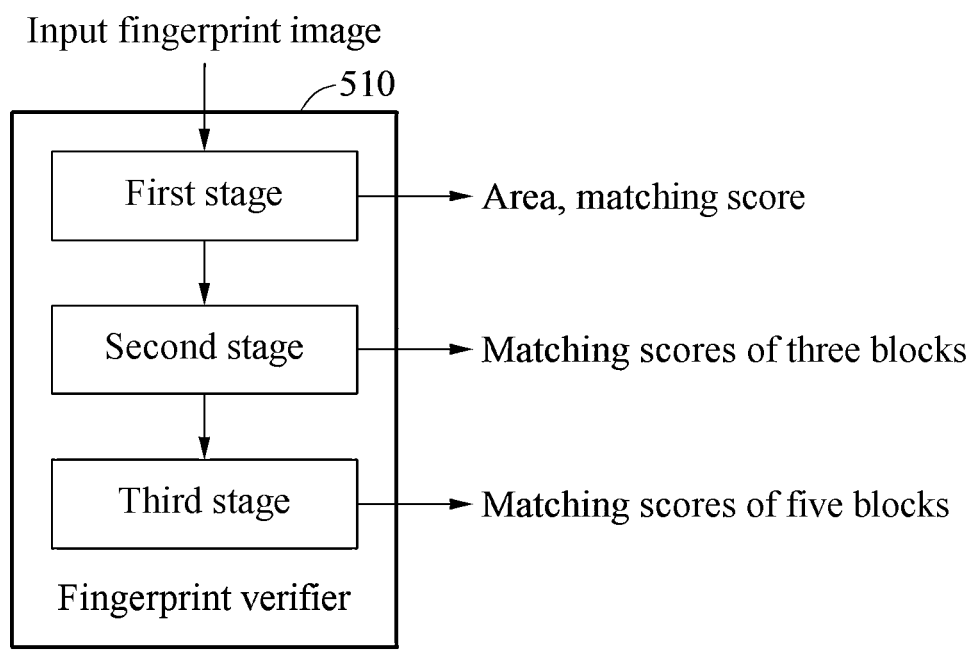
FIG. 5 is a diagram illustrating a fingerprint verifier according to at least one example embodiment.

FIG. 5 is a diagram illustrating a fingerprint verifier 510 according to at least one example embodiment. According to at least one example embodiment, a biometric verifier described above may be the fingerprint verifier 510 of FIG. 5. Referring to FIG. 5, the fingerprint verifier 510 includes a first stage, a second stage, and a third stage, and each of the stages outputs an individual verification result based on an input fingerprint image corresponding to biometric information. The first stage outputs an overlapping area and a matching score between a registered fingerprint image and the input fingerprint image. An operation of the first stage will be described in detail with reference to FIG. 6. In at least one example embodiment, a fingerprint verifier may be implemented by a processor and memory, where the verifier is configured to receive a fingerprint image captured by a biometric sensor device that is external to the verifier.

In at least one example embodiment, each successive stage of the fingerprint verifier 510 is configured to output verification result information that provides matching scores for successively smaller blocks of a successively partitioned overlapping area between a registered image and the input image. Thus, each successive stage provides a verification result that verifies a match or mis-match between the images with successively greater granularity.

Figure 6:
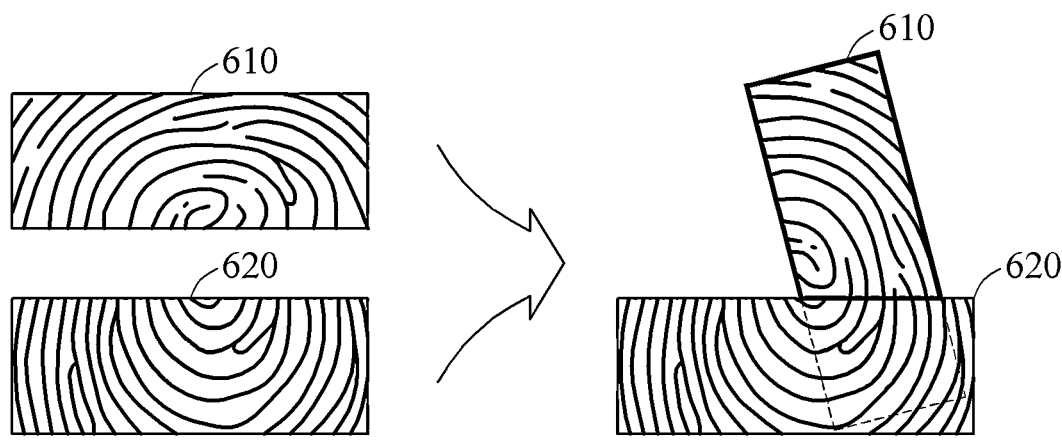
FIG. 6 is a diagram illustrating a process of matching based on a change in an input fingerprint image according to at least one example embodiment.

FIG. 6 is a diagram illustrating a process of matching based on a change in an input fingerprint image according to at least one example embodiment. Here, the change may include scaling, rotation, translation, or various combinations thereof. When the input fingerprint image and a registered fingerprint image are obtained through a same sensor, the scaling may be omitted.

In at least one example embodiment, a first stage of a fingerprint image verifier may, upon receiving an input image and comparing the input image with a registered image associated with a registered user, rotate, translate, and/or scale the input image to increase and/or maximize matching (e.g., a maximum matching score) between the images. Information indicating the rotation, translation, and] or scaling of the input image may be included in the output verification information of the first stage of the verifier. The resulting matching score may also be included as the output of the first stage (e.g., verification result of the first stage). In at least one example embodiment, successive stages of the fingerprint image verifier may be implemented to partition the input image into blocks, match each block to one or more registered images, and calculate matching scores for each block that may be included in the verification result information of the given successive stages.

FIG. 6 illustrates an input fingerprint image 610 and a registered fingerprint image 620. The input fingerprint image 610 and the registered fingerprint image 620 may be obtained through a fingerprint recognizing device, for example, a fingerprint sensor. The registered fingerprint image 620 may be pre-stored in a database. A sensing area of the fingerprint sensor may be smaller than a size of a fingerprint of a user, and thus the input fingerprint image 610 and the registered fingerprint image 620 may be a partial image including information about only a portion of the fingerprint. To determine an overlapping area and a matching score between the input fingerprint image 610 and the registered fingerprint image 620, rotation and translation may be performed on the input fingerprint image 610.

The first stage may rotate and translate the input fingerprint image 610 to overlap a shared area in the input fingerprint image 610 and a shared area in the registered fingerprint image 620. The first stage may match the input fingerprint image 610 and the registered fingerprint image 620 using various methods. For example, the first stage may determine translation information and rotation information between the input fingerprint image 610 and the registered fingerprint image 620 based on a frequency-based matching method. The frequency-based matching method may be a method of performing matching in a frequency domain.

The translation information between the input fingerprint image 610 and the registered fingerprint image 620 may include an x-axis translation parameter Tx and a y-axis translation parameter Ty. In addition, the rotation information between the input fingerprint image 610 and the registered fingerprint image 620 may include a rotation parameter R. Here, Tx and Ty are also referred to as a translation, and R as a rotation angle.

The first stage may translate and rotate the input fingerprint image 610 based on the translation information and the rotation information obtained as a result of the matching. The translation information and the rotation information may be relative information between the input fingerprint image 610 and the registered fingerprint image 620, and thus the first stage may translate and rotate the registered fingerprint image 620 instead of translating and rotating the input fingerprint image 610.

The first stage may obtain the overlapping area and the matching score between the input fingerprint image 610 and the registered fingerprint image 620 after translating and rotating the input fingerprint image 610 or the registered fingerprint image 620. For example, the matching score may be obtained based on an image brightness value-based normalized correlation between the input fingerprint image 610 and the registered fingerprint image 620. The first stage may output the obtained overlapping area and the obtained matching score. For convenience of description, one registered fingerprint image is illustrated as the registered fingerprint image 620. However, a plurality of registered fingerprint images may be included in the database as the registered fingerprint image 620. In such a case, the first stage may match the input fingerprint image 610 and each of the registered fingerprint images, and output an overlapping area and a matching score between the input fingerprint image 610 and each of the registered fingerprint images. The first stage may be processed within a relatively short period of time compared to other stages. However, a VR based on an individual verification result of the first stage may be lower compared to VRs of the other stages.

The described operations of the first stage may be applicable to operations of the second stage and the third stage. However, the second stage and the third stage may further perform an operation of partitioning an input fingerprint image into a plurality of blocks and matching each of the blocks to a registered fingerprint image. Referring back to FIG. 5, the second stage may partition an input fingerprint image into a particular (or, alternatively, predetermined) number of blocks, for example, three blocks. The second stage may output matching scores between the three blocks and a registered fingerprint image. In addition, the third stage may partition the input fingerprint image into a greater number of blocks, for example, five blocks, compared to the second stage, and output matching scores between the five blocks and a registered fingerprint image. The operations of the second stage and the third stage will be described in detail with reference to FIG. 7.

Figure 7:
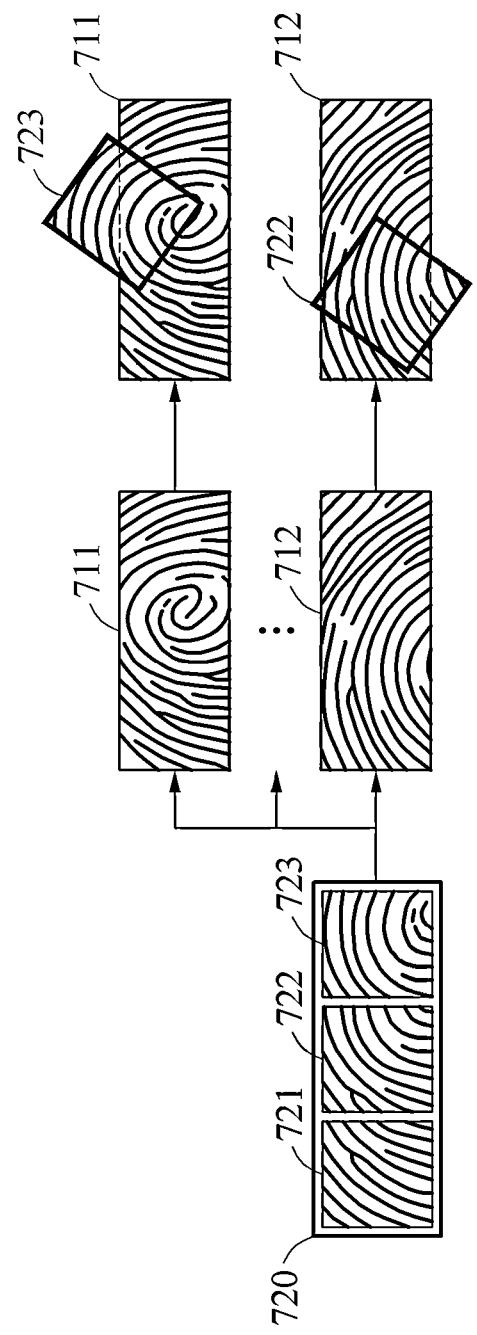
FIG. 7 is a diagram illustrating a process of partitioning an input fingerprint image and of matching according to at least one example embodiment.

FIG. 7 is a diagram illustrating a process of partitioning an input fingerprint image 720 and a process of matching according to at least one example embodiment. Operations of the second stage to be described hereinafter may be applicable to operations of the third stage.

In at least one example embodiment, a second (and or third, fourth, etc.) stage of a fingerprint verifier may be implemented to partition the input image into multiple blocks and match the individual blocks, with the rotation/translation/scaling information from the first block, to one or more stored registered images. A matching score for each block with regard to each utilized registered image may be determined based on the matching.

Referring to FIG. 7, the second stage partitions the input fingerprint image 720 into a plurality of blocks, for example, a block 721, a block 722, and a block 723. The second stage may compare the blocks 721 through 723 to registered fingerprint images 711 and 712, instead of comparing the input fingerprint image 720 to the registered fingerprint images 711 and 712.

The second stage may partition the input fingerprint image 720 using various methods. For example, the second stage may partition the input fingerprint image 720 based on a preset pattern. The pattern may be determined in advance based on a shape and a size of a sensing area of a fingerprint sensor, and a shape and a size of a registered partial image. The pattern may dynamically change as necessary. Also, the input fingerprint image 720 may be partitioned not to overlap the blocks 721 through 723, or to overlap neighboring blocks among the blocks 721 through 723 by a certain area. In at least one example embodiment, partitioning the input image into blocks results in a reduced overlapping area between the input image and the registered image(s). In at least one example embodiment, a ratio of the overlapping area between the block and the registered image to a total area of the block may be high, thereby improving matching accuracy.

Using the blocks 721 through 723, the second stage may have an improved matching efficiency. When the input fingerprint image 720 is input, partitioning the input fingerprint image 720 into a plurality of blocks, for example, the blocks 721 through 723, and performing matching may be more effective because an overlapping area between the input fingerprint image 720 and each of the registered fingerprint images 711 and 712 is not large. A ratio of an overlapping area between the block 723 and the registered fingerprint image 711 to an entire area of the block 723 may be higher than a ratio of an overlapping area between the input fingerprint image 720 and the registered fingerprint image 711 to an entire area of the input fingerprint image 720, and thus such a block-based matching may be more accurately and effectively performed.

The second stage may match a block and a registered fingerprint image by translating and rotating the block, and calculate a matching score based on an overlapping area between the block and the registered fingerprint image. For example, as illustrated in FIG. 7, the second stage may calculate matching scores of various combinations of the three blocks 721 through 723 and the registered fingerprint images 711 and 712. Here, based on a result of the matching performed by the first stage, the second stage may use only a portion of registered fingerprint images that is highly ranked based on the result of the matching performed by the first stage, instead of using all the registered fingerprint images stored in a database. In at least one example embodiment, the first stage may identify (e.g., be implemented to identify) the registered images for which the matching scores with the entire input image are the greatest scores, and such a limited selection of registered images may be selected to be used in the second stage, such that the matching between blocks and registered images is only performed with regard to the limited selection of registered images that were associated with a relatively high matching score in the first stage, thereby reducing processing time in the second stage.

Using a method similar to the method applied to the second stage, the third stage may partition the input fingerprint image 720 into five blocks, and calculate a matching score of each of the five blocks. The third stage may output highly ranked K scores by arranging the matching scores of the five blocks. In addition, the third stage may output a feature value of a plurality of matching scores. Here, the feature value refers to a value indicating a feature associated with the matching scores, for example, a statistical value such as a mean value. For example, the third stage may output a mean value of top three matching scores along with the top three matching scores among the matching scores of the five blocks. The third stage may improve accuracy in user verification using such a feature value. Based on a result of the matching performed by the second stage, the third stage may use only a portion of registered fingerprint images that is highly ranked based on the result of the matching performed by the second stage, instead of using all the registered fingerprint images stored in the database. In at least one example embodiment, the third and successive stages of a fingerprint verifier may operate similarly to the second stage, where the input image is successively partitioned into a greater quantity of smaller blocks, and the smaller blocks are matched with the limited selection of registered images. Successive stages may use successively more limited selections of registered images, using the most highly matching registered images from the preceding stages.

In at least one example embodiment, the second and/or third stage may output "K scores" and/or a "feature value" of a plurality of matching scores of the blocks matched in the given stage. In at least one example embodiment, a "feature value" is a value that is associated with the combination of matching scores of the blocks. For example, the feature value may be an arithmetic mean value of the multiple matching scores of the blocks matched in the given stage. The feature value may be associated with a limited selection of the matching scores of the blocks, including being a value associated with the top three matching scores of five blocks.

Figure 8:
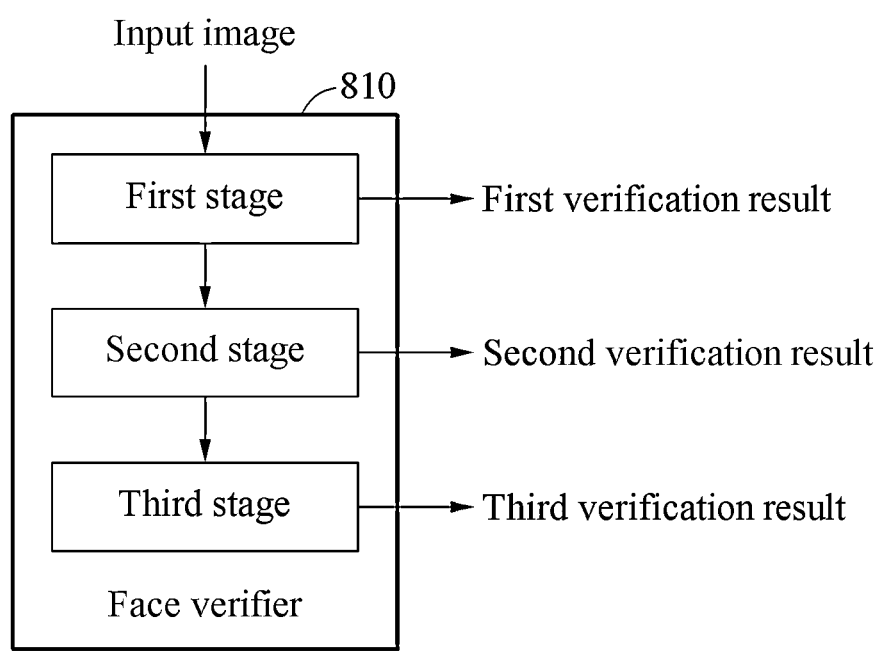
FIG. 8 is a diagram illustrating a face verifier according to at least one example embodiment.

FIG. 8 is a diagram illustrating a face verifier 810 according to at least one example embodiment. According to an example embodiment, a biometric verifier described above may be the face verifier 810. Referring to FIG. 8, the face verifier 810 includes a first stage, a second stage, and a third stage, and each of the stages may output an individual verification result based on an input image, for example, a face image, corresponding to biometric information. The face verifier 810 may output an individual verification result of each layer by comparing features to be output by a plurality of layers in a neural network in response to the input image and features of a pre-stored registered image corresponding to the layers. The stages included in the face verifier 810 may correspond to the layers, respectively. A process of outputting an individual verification result will be described with reference to FIG. 9.

In at least one example embodiment, the face verifier 810 may be configured to output verification result information according to a selected stage, where the verification information generated by an intermediate stage may be provided to a subsequent stage as input data to the subsequent stage.

In at least one example embodiment, the face verifier 810 may be configured to operate in a neural network having a plurality of layers, where each separate layer may perform a particular processing of the input image and the outputs of different layers may correspond to separate stages, such that an output from a selected termination stage may correspond to an output of one or more particular layers of the neural network.

Figure 9:
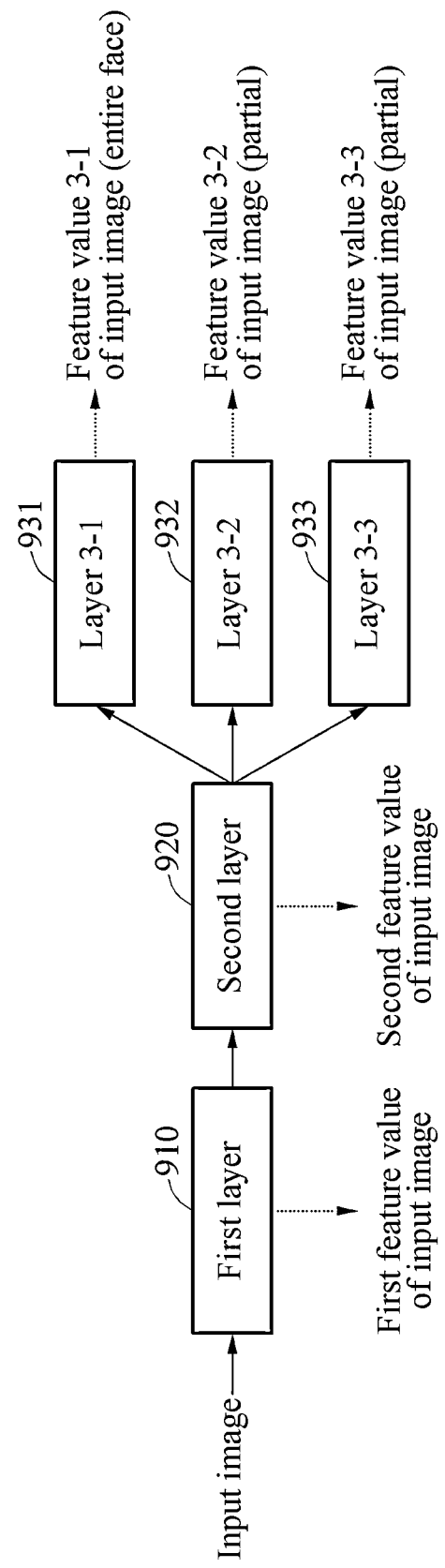
FIG. 9 is a diagram illustrating a plurality of layers included in a face verifier according to at least one example embodiment.

FIG. 9 is a diagram illustrating a plurality of layers included in a face verifier according to at least one example embodiment. Hereinafter, a description will be provided with reference to the first through third stages included in the face verifier 810 of FIG. 8. Referring to FIG. 9, the face verifier 810 includes a first layer 910, a second layer 920, layer 3-1 931, layer 3-2 932, and layer 3-3 933. The first layer 910, the second layer 920, and the layers 931 through 933 may be trained in advance to output a feature value of the input image. The face verifier 810 may be trained in advance to output an individual verification result based on a distance between the feature value of the input image output from the first layer 910, the second layer 920, and the layers 931 through 933, and a feature value of a pre-registered image. Although, in FIG. 9, a third layer includes the layers 931 through 933 connected in parallel with the second layer 920, a neural network in various structures other than the structure illustrated in FIG. 9 may be applicable.

In at least one example embodiment, a face verifier includes multiple "layers" that each represent a particular processing of one or more portions of the input image, where one or more layers may correspond to one or more "stages" of the verifier, such that an output of a layer corresponding to the selected termination stage is provided as the verification result information of the verifier.

In at least one example embodiment, the verification result output from each layer is at least one feature value associated with the input image. In at least one example embodiment, each "stage" of the verifier may be implemented to compare a feature value "output" from the corresponding layer to a corresponding stored feature value of the registered image, and the corresponding stored feature value of the registered image may be a feature value output by the corresponding layer when the registered image is processed by the layer. In at least one example embodiment, the verifier may output a given verification result indicating a determined distance between the feature value of the input image and a feature value of a registered image. In at least one example embodiment, such a distance value may be represented as a "matching score."

The first layer 910 may output a first feature value of the input image based on the input image. The first stage of the face verifier 810 may compare the first feature value of the input image to a first feature value of the registered image, and output a first individual verification result based on a distance between the first feature value of the input image and the first feature value of the registered image. The first individual verification result may be a verification score. The first feature value of the registered image may be output in advance by the first layer 910, and stored in a database. Similarly, the second stage may output a second individual verification result using the second layer 920. The second layer 920 may be a layer higher than the first layer 910, and thus the second individual verification result based on a second feature value of the input image may have a higher VR than the first individual verification result based on the first feature value of the input image.

The third stage may output a third individual verification result using the layers 931 through 933. The layer 3-1 931, the layer 3-2 932, and the layer 3-3 933 may output feature value 3-1 of the input image, feature value 3-2 of the input image, and feature value 3-3 of the input image, respectively. The third stage of the face verifier 810 may compare the feature value 3-1 of the input image, the feature value 3-2 of the input image, and the feature value 3-3 of the input image to feature value 3-1 of the registered image, feature value 3-2 of the registered image, and feature value 3-3 of the registered image, and output the third individual verification result based on a distance between the feature values.

At the first and second stages, the first feature value and the second feature value of the registered image may be feature values associated with an entire face of a user. In such a case, the first and second stages may output the individual verification results based on the entire face of the user.

At the third stage, the feature value 3-1 of the registered image may be a feature value associated with the entire face of the user, and the feature value 3-2 and the feature value 3-3 of the registered image may be feature values associated with a portion of the face of the user, for example, an eye, a nose, lips, or an ear of the user. The third stage may output the individual verification result based on both the entire face of the user and the portion of the face of the user. Thus, the third individual verification result of the third stage may have a higher VR than the first and second individual verification results.

The first through third individual verification results may include matching scores between the feature values of the input image and the feature values of the registered image. The third individual verification result may include a plurality of matching scores associated with the entire face and the portion of the face. In addition, the third individual verification result may also include a statistical value, for example, a mean value, of the matching scores. For example, the third stage may output a matching score of the face, a matching score of a first portion of the face, a matching score of a second portion of the face, and also a mean value of the matching scores. The third stage may improve accuracy in user verification using the matching scores and the statistical value.

In at least one example embodiment, a given stage may compare multiple feature values from multiple, parallel layers with multiple corresponding feature values of the registered image. In at least one example embodiment, a verification result from a given stage of the facial verifier includes a matching score generated based on the comparison of the feature values of the input image and the registered image, where the matching score represents a distance between the feature values. Such matching scores may be accompanied by statistical values associated with the matching scores.

As described above, an individual verification result of each of a plurality of biometric verifiers may be expressed by a vector. The individual verification result may have a dimension corresponding to the number of output values. For example, the third stage of the fingerprint verifier 510 of FIG. 5 may output top three matching scores among the matching scores of the five blocks, along with a mean value of the top three matching scores. In such an example, an individual verification result of the third stage of the fingerprint verifier 510 may be represented by a 4-dimension vector. Similarly, the third stage of the face verifier 810 of FIG. 8 may output three matching scores associated respectively with the face, and the first portion and the second portion of the face, along with a mean value of the three matching scores. In such an example, an individual verification result of the third stage of the face verifier 810 may be represented by a 4-dimension vector. A fusion model may receive the 4-dimension vector from each of the fingerprint verifier 510 and the face verifier 810 and receive, as an input, an 8-dimension vector by a combination of the two 4-dimension vectors. In at least one example embodiment, the fusion model may generate a final verification result based on the multi-dimensional vector received from a combination of the vectors from the verifiers.

In at least one example embodiment, the fusion model may be implemented to combine the vectors to determine a matching score corresponding to the combination of the input images provided to the multiple vector, and where the fusion model determines whether the identity associated with the input images is the identity of a registered user associated with the registered images based on a determination that the matching score at least meets a threshold that is associated with the required FAR/VR of the verification request. A fusion model may be, for example, an SVM, that is trained to receive an n-dimension vector as an input and output a final verification result.

The fusion model may output a final verification result from the 8-dimension vector. As described above, the fusion model may be, for example, an SVM trained to output the final verification result by receiving the 8-dimension vector as an input. Although an operation of the fusion model based on the combination of the third stage of the fingerprint verifier 510 and the third stage of the face verifier 810 is described herein, the fusion model may include individual models corresponding to combinations of all stages and the individual models may be trained in advance to output a final verification result when individual verification results are input.

Figure 10:
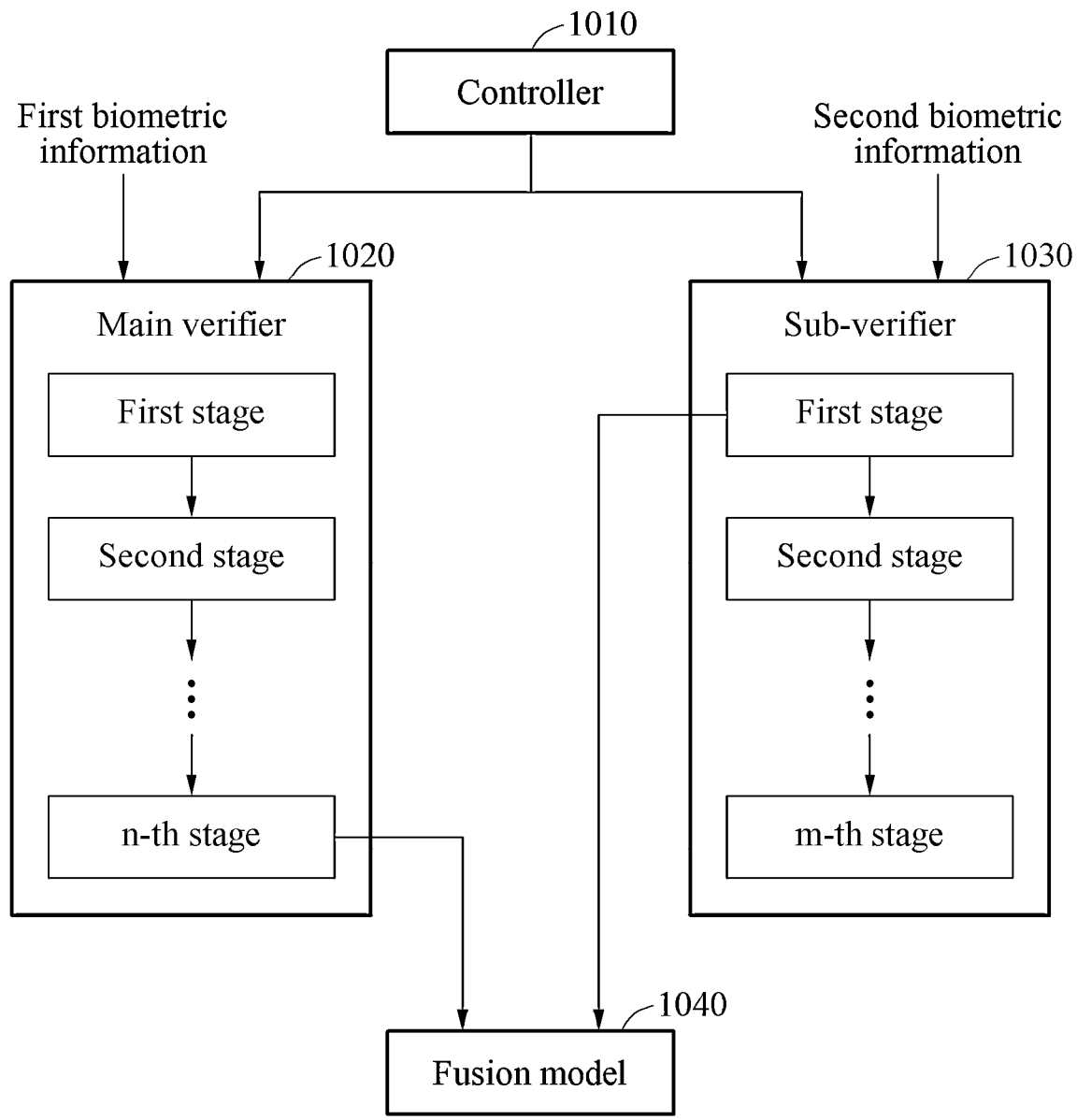
FIG. 10 is a diagram illustrating a main verifier and a sub-verifier according to at least one example embodiment.

FIG. 10 is a diagram illustrating a main verifier and a sub-verifier according to at least one example embodiment. Referring to FIG. 10, a controller 1010 determines a main verifier 1020 and a sub-verifier 1030 among a plurality of biometric verifiers. The main verifier 1020 is a verifier mainly used for user verification, and the sub-verifier 1030 is a verifier additionally used for the user verification. For example, the controller 1010 may select, from various combinations of a termination stage of the main verifier 1020 and a termination stage of the sub-verifier 1030, a combination that may increase a level of the termination stage of the main verifier 1020. For example, a combination that allows the main verifier 1020 to output an individual verification result at an n-th stage, and the sub-verifier 1030 to output an individual verification result at a first stage may be selected from the combinations. A fusion model 1040 may output a final verification result based on individual verification results of the main verifier 1020 and the sub-verifier 1030.

Alternatively, the controller 1010 may determine a stage of the main verifier 1020 and a stage of the sub-verifier 1030 based on selection information. The selection information may include a minimum required stage of the main verifier 1020 and a maximum required stage of the sub-verifier 1030. The controller 1010 may determine, to be a termination stage, a stage upper than or equal to the minimum required stage of the main verifier 1020 and a stage lower than or equal to the maximum required stage of the sub-verifier 1030.

The controller 1010 may determine the main verifier 1020 and the sub-verifier 1030 based on a particular (or, alternatively, predetermined) criterion including at least one of an application type, a security level, a sensing environment, main verification or auxiliary verification, and a selection by a user. For example, when an intensity of illumination is low, a performance of a face recognizer may deteriorate and the controller 1010 may thus set a fingerprint recognizer to be the main verifier 1020 and the face recognizer to the sub-verifier 1030. Alternatively, to increase accuracy of the face recognizer when the intensity of illumination is low, the controller 1010 may set the face recognizer to be the main verifier 1020 and increase a level of a termination stage of the face recognizer. For another example, when a degree of humidity is high, a performance of the fingerprint recognizer may deteriorate and the controller 1010 may then set the face recognizer to be the main verifier 1020 and the fingerprint recognizer to be the sub-verifier 1030. Alternatively, to increase accuracy of the fingerprint recognizer when the degree of humidity is high, the controller 1010 may set the fingerprint recognizer to be the main verifier 1020 and increase a level of a termination stage of the fingerprint recognizer.

In at least one example embodiment, a controller may select a "main" verifier and "sub-verifier" based on a desired level of the termination stages of the selected verifiers, where the "main verifier" is identified as the verifier having a higher level of termination stage than the sub-verifier. In at least one example embodiment, if and/or when two verifiers have a common level of the termination stage, one of the two verifiers may be set as a main verifier and the other may be set as a sub-verifier.

In at least one example embodiment, the stages of the verifiers may be determined based on a main verifier and the where the information specifies a minimum and/or maximum stage of one or more particular verifiers. In at least one example embodiment, the selection information may be associated with a particular FAR/VR that is associated with a received verification request.

In at least one example embodiment, a limited selection of verifiers may be selected based on a set of criteria values. The criteria values may be determined based on sensor input, user input, parameters associated with an application from which a verification request is received, some combination thereof, or the like.

Figure 11:
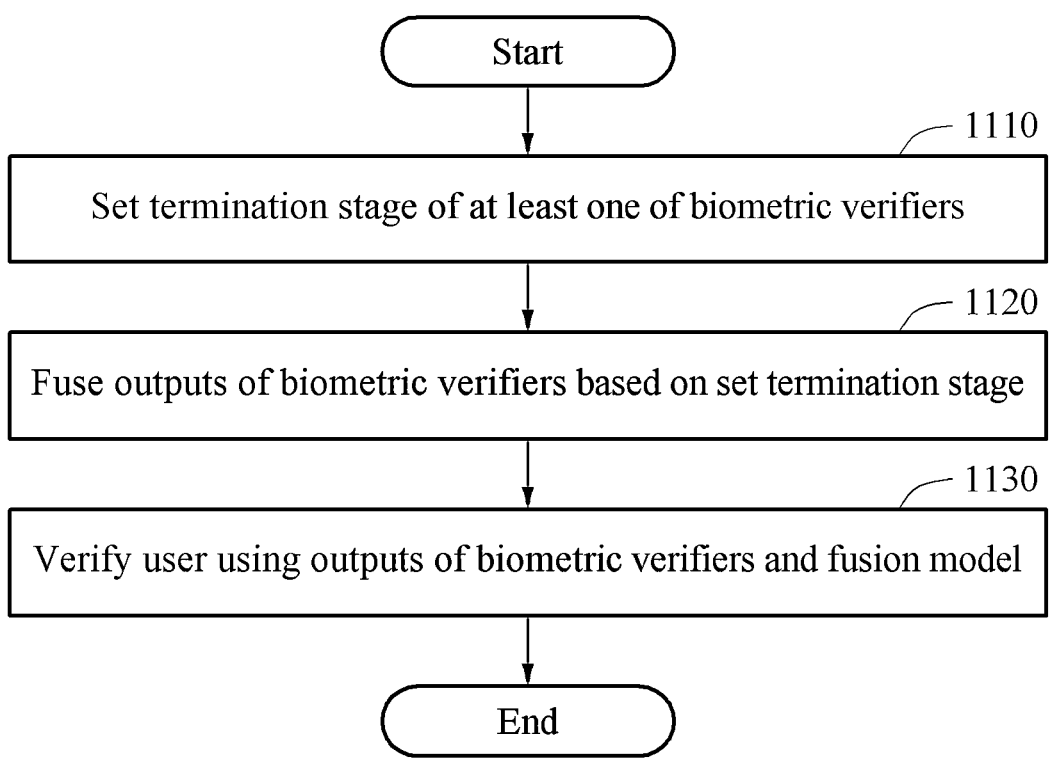
FIG. 11 is a flowchart illustrating a user verification method according to at least one example embodiment.

FIG. 11 is a flowchart illustrating a user verification method according to at least one example embodiment. The method illustrated in FIG. 11 may be implemented by a single apparatus, including the user verification apparatus 110 illustrated in FIG. 1. Referring to FIG. 11, in operation 1110, a user verification apparatus sets a termination stage of at least one of a plurality of biometric verifiers. In operation 1120, the user verification apparatus selects a fusion model that fuses outputs of the biometric verifiers based on the set termination stage. In operation 1130, the user verification apparatus verifies a user using the outputs of the biometric verifiers and the fusion model. The descriptions provided with reference to FIGS. 1 through 10 may be applicable to the operations described with reference to FIG. 11, and thus a more detailed description will be omitted here.

Figure 12:
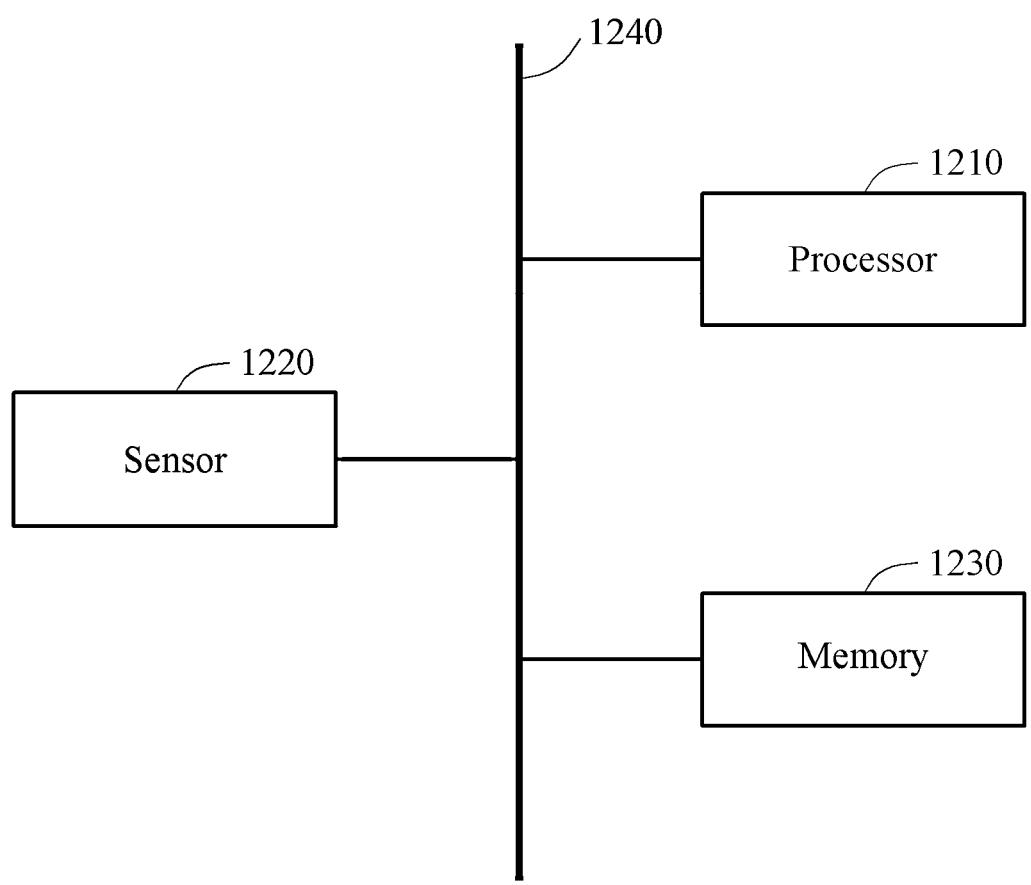
FIG. 12 is a diagram illustrating an electronic system according to at least one example embodiment.

FIG. 12 is a diagram illustrating an electronic system according to at least one example embodiment. The electronic system shown in FIG. 12 may encompass the user verification apparatus 110 shown in FIG. 1. Referring to FIG. 12, the electronic system includes a sensor 1220, a processor 1210, and a memory 1230. The sensor 1220, the processor 1210, and the memory 1230 may communicate with one another through a bus 1240. The sensor 1210 may include, for example, a fingerprint sensor, an image sensor, and an ECG sensor to detect biometric information of a user including, for example, a face, a fingerprint, an iris, a vein, palm lines, a shape of an ear, and an ECG. The sensor 1220 may detect the biometric information of the user using a well-known method, for example, a method of converting an optical image to an electrical signal. The biometric information may be output to the processor 1210.

The processor 1210 may include at least one apparatus described with reference to FIGS. 1 through 11, or at least one method described with reference to FIGS. 1 through 11. For example, the processor 1210 may include at least one of the controller 210, the biometric verifiers 220 and 230, and the fusion model 240 illustrated in FIG. 2. The memory 1230 may store a registered fingerprint image or registered images obtained by the sensor 1220, an input fingerprint image or input images obtained by the sensor 1220, matching results processed by the processor 1210, and/or matching scores calculated by the processor 1210. The memory 1230 may be a volatile memory or a nonvolatile memory.

The processor 1210 may execute a program and control the electronic system. A program code to be executed by the processor 1210 may be stored in the memory 1230. The electronic system may be connected to an external device, for example, a personal computer (PC) or a network, through an input and output device (not shown), and exchange data with the external device. The electronic system may include various electronic systems, for example, a mobile device such as a mobile phone, a smartphone, a personal digital assistant (PDA), a tablet computer, and a laptop computer, a computing device such as a PC, a tablet computer, and a netbook, and an electronic product such as a television (TV), a smart TV, and a security device for gate control.

In at least one example embodiment, the processor 1210 and memory 1230 alone may implement the verification process shown in FIG. 11 and illustrated in the other figures, provided that input information is received from an external biometric sensor device.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While at least one example embodiment have been particularly shown and described, it will be understood by one of ordinary skill in the art that variations in form and detail may be made therein without departing from the spirit and scope of the claims.

What is claimed is:

1. A user verification method performed by a controller of a user verification apparatus, the method comprising:
    obtaining a plurality of biometric verifiers, at least one biometric verifier of the plurality of biometric verifiers being configured to perform a verification process that terminates at any one of a plurality of successive verification stages, wherein each verification stage of the plurality of successive verification stages corresponds to at least one of a particular verification performance, a particular verification accuracy, and a particular verification speed, wherein each biometric verifier of the plurality of biometric verifiers is implemented as a neural network, and the plurality of successive verification stages of the biometric verifier correspond to a plurality of successive layers of the neural network;
    setting, based on a particular criterion, a termination stage of each biometric verifier of the plurality of biometric verifiers by selecting the termination stage from the plurality of successive layers of the neural network, such that each biometric verifier of the plurality of biometric verifiers is associated with a separate termination stage of a particular combination of termination stages, respectively, wherein the termination stage of each biometric verifier is one of the plurality of successive verification stages, wherein the particular criterion includes a sensing environment associated with the user verification apparatus;
    executing the plurality of biometric verifiers, based on the particular combination of termination stages associated with the plurality of biometric verifiers, to generate a plurality of outputs;
    fusing the plurality of outputs based on the particular combination of termination stages associated with the plurality of biometric verifiers to generate a result; and
    verifying a user based on the result.

2. The method of claim 1, wherein each biometric verifier is configured to be executed to output an individual verification result through a set of stages of the biometric verifier, the set of stages including at least one stage.

3. The method of claim 2, wherein
    for each biometric verifier, the set termination stage of the biometric verifier is a particular stage of the plurality of successive verification stages of the biometric verifier, and
    each biometric verifier is configured to be executed to output an individual verification result corresponding to the set termination stage of the biometric verifier.

4. The method of claim 1, wherein the particular criterion further includes at least one of:
    an application type associated with a received verification request,
    a security level associated with the received verification request,
    a determination of whether the at least one biometric verifier is to be executed to perform main verification or auxiliary verification, and
    a selection by the user at a user interface.

5. The method of claim 3, wherein the particular stage of the plurality of successive verification stages is a stage at which a verification rate (VR) and a false acceptance rate (FAR) associated with an individual verification result of the stage at least meet a threshold VR and a threshold FAR, respectively, based on the particular criterion.

6. The method of claim 1, wherein the plurality of biometric verifiers are configured to be executed to perform biometric verification of different modalities.

7. The method of claim 1, wherein each biometric verifier of the plurality of biometric verifiers is configured to be executed to perform biometric verification based on received biometric information, the received biometric information including one of a face, a fingerprint, an iris, a vein, palm lines, a shape of an ear, and an electrocardiogram (ECG).

8. The method of claim 1, wherein the fusing includes
    fusing the plurality of outputs based on executing a fusion model corresponding to the particular combination of termination stages associated with the plurality of biometric verifiers among a plurality of fusion models associated with separate, respective combinations of termination stages associated with the plurality of biometric verifiers.

9. The method of claim 1, wherein the verifying includes
    verifying the user based on comparing the result of the fusing and a threshold value corresponding to the particular combination of termination stages of the plurality of biometric verifiers.

10. The method of claim 1, wherein
    at least one biometric verifier of the plurality of biometric verifiers includes a fingerprint verifier,
    the fingerprint verifier is configured to be executed to output an individual verification result based on executing each stage of a plurality of stages of the fingerprint verifier,
    executing a first stage of the plurality of stages includes outputting an overlapping area and a matching score between a registered fingerprint image and an input fingerprint image, and
    executing a second stage of the plurality of stages includes outputting matching scores between the registered fingerprint image and blocks generated based on partitioning the input fingerprint image.

11. The method of claim 1, wherein
    at least one biometric verifier of the plurality of biometric verifiers includes a face verifier, and the face verifier is configured to be executed to output an individual verification result of each layer based on comparing features to be output by multiple layers in the neural network, based on an input image and features of a stored registered image corresponding to the multiple layers.

12. The method of claim 1, wherein the setting includes selecting one biometric verifier of the plurality of biometric verifiers as a main verifier, selecting another biometric verifier of the plurality of biometric verifiers as a sub-verifier, and selecting, from a plurality of separate combinations of a termination stage of the main verifier and a termination stage of the sub-verifier, a particular combination of the termination stage of the main verifier and the termination stage of the sub-verifier that increases a level of the termination stage of the main verifier, wherein the fusing includes
fusing the plurality of outputs using a fusion model configured to output a final verification result to verify the user based on an input vector of a dimension corresponding to an output of a set termination stage of the particular combination of termination stages.

13. A non-transitory computer-readable storage medium storing instructions that, when executed by a processor of a user verification apparatus, cause the processor to perform a user verification method, the user verification method comprising:

obtaining a plurality of biometric verifiers, at least one biometric verifier of the plurality of biometric verifiers being configured to perform a verification process that terminates at any one of a plurality of successive verification stages, wherein each verification stage of the plurality of successive verification stages corresponds to at least one of a particular verification performance, a particular verification accuracy, and a particular verification speed, wherein each biometric verifier of the plurality of biometric verifiers is implemented as a neural network, and the plurality of the successive verification stages of the plurality of biometric verifiers correspond to a plurality of successive layers of the neural network;

setting, based on a particular criterion, a termination stage of each biometric verifier of the plurality of biometric verifiers by selecting the termination stage from the plurality of successive layers of the neural network, such that each biometric verifier of the plurality of biometric verifiers is associated with a separate termination stage of a particular combination of termination stages, respectively, wherein the termination stage of each biometric verifier is one of the plurality of successive verification stages, wherein the particular criterion includes a sensing environment associated with the user verification apparatus;

executing the plurality of biometric verifiers, based on the particular combination of termination stages associated with the plurality of biometric verifiers, to generate a plurality of outputs;

fusing the plurality of outputs based on the particular combination of termination stages associated with the plurality of biometric verifiers to generate a result; and verifying a user based on the result.

14. A user verification apparatus, comprising:
a memory storing a program of instructions; and
a processor configured to execute the program of instructions to obtain a plurality of biometric verifiers, at least one biometric verifier of the plurality of biometric verifiers being configured to perform a verification process that terminates at any one of a plurality of successive verification stages, wherein each verification stage of the plurality of successive verification stages corresponds to at least one of a particular verification performance, a particular verification accuracy, and a particular verification speed, wherein each biometric verifier of the plurality of biometric verifiers is implemented as a neural network, and the plurality of successive verification stages of the biometric verifier correspond to a plurality of successive layers of the neural network, set, based on a particular criterion, a termination stage of each biometric verifier of the plurality of biometric verifiers by selecting the termination stage from the plurality of successive layers of the neural network, such that each biometric verifier of the plurality of biometric verifiers is associated with a separate termination stage of a particular combination of termination stages, respectively, wherein the termination stage of each biometric verifier is one of the plurality of successive verification stages, wherein the particular criterion includes a sensing environment associated with the user verification apparatus, execute the plurality of biometric verifiers, based on the particular combination of termination stages associated with the plurality of biometric verifiers, to generate a plurality of outputs, fuse the plurality of outputs based on the particular combination of termination stages associated with the plurality of biometric verifiers to generate a result, and verify a user based on the result.

15. The user verification apparatus of claim 14, wherein each biometric verifier is configured to be executed to output an individual verification result through a set of stages of the biometric verifier, the set of stages including at least one stage.

16. A smart phone, comprising:
a memory storing a program of instructions; and
a processor configured to execute the program of instructions to obtain a plurality of biometric verifiers, at least one biometric verifier of the plurality of biometric verifiers being configured to perform a verification process that terminates at any one of a plurality of successive verification stages, wherein each verification stage of the plurality of successive verification stages corresponds to at least one of a particular verification performance, a particular verification accuracy, and a particular verification speed, wherein each biometric verifier of the plurality of biometric verifiers is implemented as a neural network, and the plurality of successive verification stages of the biometric verifier correspond to a plurality of successive layers of the neural network, set, based on a particular criterion, a termination stage of each biometric verifier of the plurality of biometric verifiers, by selecting the termination stage from the plurality of successive layers of the neural network such that each biometric verifier of the plurality of biometric verifiers is associated with a separate termination stage of a particular combination of termination stages, respectively, wherein the termination stage of each biometric verifier is one of the plurality of successive verification stages, wherein the particular criterion includes a sensing environment associated with the smart phone, execute the plurality of biometric verifiers, based on the particular combination of termination stages associated with the plurality of biometric verifiers, to generate a plurality of outputs, fuse the plurality of outputs based on the particular combination of termination stages associated with the plurality of biometric verifiers to generate a result, and verify a user based on the result.

17. The smart phone of claim 16, wherein each biometric verifier is configured to be executed to output an individual verification result through a set of stages of the biometric verifier, the set of stages including at least one stage.

* * * * *